(12) United States Patent　　(10) Patent No.:　US 12,587,388 B2

Benson　　(45) Date of Patent:　＊Mar. 24, 2026

(54) SYSTEMS AND METHODS FOR TRUSTED PATH SECURE COMMUNICATION

(71) Applicant: ACCERTIFY, INC., Itasca, IL (US)

(72) Inventor: Glenn S. Benson, Newton, MA (US)

(73) Assignee: Accertify Inc.

( * ) Notice:　Subject to any disclaimer, the term of this patent is extended or adjusted under 35 U.S.C. 154(b) by 0 days.

This patent is subject to a terminal disclaimer.

(21) Appl. No.: 18/483,317

(22) Filed:　Oct. 9, 2023

(65)　　　Prior Publication Data

US 2024/0039737 A1　　Feb. 1, 2024

Related U.S. Application Data

(60) Continuation of application No. 17/521,138, filed on Nov. 8, 2021, now Pat. No. 11,818,274, which is a (Continued)

(51) Int. Cl.
H04L 29/06　　　(2006.01)
G06F 21/53　　　(2013.01)
(Continued)

(52) U.S. Cl.
CPC ............ H04L 9/3247 (2013.01); G06F 21/53 (2013.01); G06F 21/564 (2013.01); G06F 21/57 (2013.01); G06F 21/606 (2013.01); G06F 21/64 (2013.01); G06Q 20/382 (2013.01); H04L 63/0272 (2013.01); H04L 63/123 (2013.01);

(Continued)

(58) Field of Classification Search
None
See application file for complete search history.

(56)　　　References Cited

U.S. PATENT DOCUMENTS 4,933,969 A　　6/1990　Marshall et al.
4,969,188 A　　11/1990　Schobi
(Continued)

FOREIGN PATENT DOCUMENTS

WO　　WO 1997/004394 A1　　2/1997
WO　　WO 2008/113299 A1　　9/2008
WO　　WO 2013/081441 A1　　6/2013

*Primary Examiner* — Maung T Lwin
(74) *Attorney, Agent, or Firm* — Shannon McQue

(57)　　　ABSTRACT

A system for establishing a trusted path for secure communication between client devices and server devices, such as between an account holder and a financial institution, can provide the core security attributes of confidentiality (of the parties), integrity (of the information), anti-replay (protection against replay fraud) and/or anti-tampering (protection against unauthorized changes to information being exchanged and/or modules that generate and communicate such information). A messaging layer implementation in favor of a transport layer implementation can provide a trusted path. This infrastructure features secure cryptographic key storage, and implementation of a trusted path built using the cryptographic infrastructure. The trusted path protects against unauthorized information disclosure, modification, or replays. These services can effectively protect against Man-in-the-Middle, Man-in-the-Application, and other attacks.

20 Claims, 17 Drawing Sheets

Related U.S. Application Data continuation of application No. 16/784,863, filed on Feb. 7, 2020, now Pat. No. 11,171,790, which is a division of application No. 16/266,702, filed on Feb. 4, 2019, now Pat. No. 10,848,317, which is a continuation of application No. 15/000,913, filed on Jan. 19, 2016, now Pat. No. 10,237,073.

(60) Provisional application No. 62/105,148, filed on Jan. 19, 2015.

(51) Int. Cl.

| | |
|---|---|
| *G06F 21/56* | (2013.01) |
| *G06F 21/57* | (2013.01) |
| *G06F 21/60* | (2013.01) |
| *G06F 21/64* | (2013.01) |
| *G06Q 20/38* | (2012.01) |
| *H04L 9/32* | (2006.01) |
| *H04L 9/40* | (2022.01) |
| *H04W 12/03* | (2021.01) |
| *H04W 12/10* | (2021.01) |
| *H04W 12/12* | (2021.01) |
| *H04W 12/128* | (2021.01) |
| *H04W 12/02* | (2009.01) |

(52) U.S. Cl.
CPC ........... *H04W 12/03* (2021.01); *H04W 12/10* (2013.01); *H04W 12/12* (2013.01); *H04W 12/128* (2021.01); *G06F 2221/034* (2013.01); *G06F 2221/2111* (2013.01); *H04L 63/145* (2013.01); *H04W 12/02* (2013.01)

(56) References Cited

U.S. PATENT DOCUMENTS

| | | | |
|---|---|---|---|
| 5,499,298 | A | 3/1996 | Narasimhalu et al. |
| 5,761,306 | A | 6/1998 | Lewis |
| 5,796,830 | A | 8/1998 | Johnson et al. |
| 5,815,583 | A | 9/1998 | Solomon et al. |
| 5,917,911 | A | 6/1999 | Dabbish et al. |
| 5,937,066 | A | 8/1999 | Gennaro et al. |
| 6,006,328 | A | 12/1999 | Drake |
| 6,041,133 | A | 3/2000 | Califano et al. |
| 6,069,957 | A | 5/2000 | Richards |
| 6,088,454 | A | 7/2000 | Nagashima et al. |
| 6,151,676 | A * | 11/2000 | Cuccia .................. H04L 9/3247 |
| | | | 380/278 |
| 6,185,316 | B1 | 2/2001 | Buffam |
| 6,760,752 | B1 | 7/2004 | Liu et al. |
| 6,779,114 | B1 | 8/2004 | Chow et al. |
| 6,842,862 | B2 | 1/2005 | Chow et al. |
| 6,907,127 | B1 | 6/2005 | Kravitz et al. |
| 6,915,434 | B1 | 7/2005 | Kuroda et al. |
| 6,978,384 | B1 | 12/2005 | Milliken |
| 6,981,138 | B2 | 12/2005 | Douceur et al. |
| 6,993,138 | B1 | 1/2006 | Hardjono |
| 7,043,024 | B1 | 5/2006 | Dinsmore et al. |
| 7,055,146 | B1 | 5/2006 | Durr et al. |
| 7,082,615 | B1 | 7/2006 | Ellison et al. |
| 7,107,464 | B2 | 9/2006 | Shapira et al. |
| 7,143,288 | B2 | 11/2006 | Pham et al. |
| 7,167,564 | B2 | 1/2007 | Asano et al. |
| 7,194,766 | B2 | 3/2007 | Noehring et al. |
| 7,203,837 | B2 * | 4/2007 | O'Shea .................. H04L 9/3247 |
| | | | 380/247 |
| 7,272,728 | B2 | 9/2007 | Pierson et al. |
| 7,346,170 | B2 | 3/2008 | Asano et al. |
| 7,389,357 | B2 | 6/2008 | Duffie et al. |
| 7,426,636 | B1 | 9/2008 | McGrew et al. |
| 7,509,250 | B2 | 3/2009 | Cruzado et al. |
| 7,571,343 | B1 | 8/2009 | Xiang et al. |
| 7,600,131 | B1 | 10/2009 | Krishna et al. |
| 7,746,781 | B1 | 6/2010 | Xiang |
| 7,865,741 | B1 | 1/2011 | Wood et al. |
| 8,112,787 | B2 * | 2/2012 | Buer .................... H04L 9/3234 |
| | | | 713/168 |
| 8,139,770 | B2 | 3/2012 | Zheng et al. |
| 8,190,893 | B2 | 5/2012 | Benson et al. |
| 8,196,194 | B2 | 6/2012 | Lindholm et al. |
| 8,213,907 | B2 | 7/2012 | Etchegoyen |
| 8,285,994 | B2 | 10/2012 | Shah et al. |
| 8,312,157 | B2 | 11/2012 | Jakobsson et al. |
| 8,316,421 | B2 | 11/2012 | Etchegoyen |
| 8,392,709 | B1 | 3/2013 | Agrawal |
| 8,549,644 | B2 | 10/2013 | Sallam |
| 8,577,803 | B2 | 11/2013 | Chatterjee et al. |
| 8,590,021 | B2 | 11/2013 | Steeves et al. |
| 8,667,288 | B2 * | 3/2014 | Yavuz ................... H04L 9/3247 |
| | | | 713/176 |
| 8,793,192 | B2 * | 7/2014 | Hammad ......... G06Q 20/38215 |
| | | | 705/56 |
| 8,817,984 | B2 | 8/2014 | Miller et al. |
| 8,819,839 | B2 | 8/2014 | Henry et al. |
| 8,961,619 | B2 | 2/2015 | Gum |
| 9,210,183 | B2 * | 12/2015 | Sadovsky ........... H04L 63/1408 |
| 9,294,448 | B2 | 3/2016 | Miller et al. |
| 9,559,852 | B2 | 1/2017 | Miller et al. |
| 9,722,804 | B2 | 8/2017 | Miller et al. |
| 9,769,131 | B1 | 9/2017 | Hartley et al. |
| 9,887,983 | B2 | 2/2018 | Lindemann et al. |
| 10,237,073 | B2 | 3/2019 | Benson |
| 10,848,317 | B2 | 11/2020 | Benson |
| 11,171,790 | B2 | 11/2021 | Benson |
| 2002/0044651 | A1 | 4/2002 | Tuvell |
| 2002/0138735 | A1 | 9/2002 | Felt et al. |
| 2002/0152380 | A1 * | 10/2002 | O'Shea ................. H04L 9/3247 |
| | | | 380/247 |
| 2002/0188871 | A1 | 12/2002 | Noehring et al. |
| 2003/0002676 | A1 | 1/2003 | Stachura et al. |
| 2003/0012374 | A1 * | 1/2003 | Wu ........................ H04L 9/3247 |
| | | | 713/176 |
| 2003/0023847 | A1 | 1/2003 | Ishibashi et al. |
| 2003/0028804 | A1 | 2/2003 | Noehrina et al. |
| 2003/0115341 | A1 | 6/2003 | Sinha et al. |
| 2003/0179885 | A1 | 9/2003 | Gentry et al. |
| 2003/0187999 | A1 | 10/2003 | Callum |
| 2003/0217280 | A1 | 11/2003 | Keaton et al. |
| 2004/0008711 | A1 | 1/2004 | Lahti et al. |
| 2004/0015724 | A1 | 1/2004 | Pham et al. |
| 2004/0028281 | A1 | 2/2004 | Cheng et al. |
| 2004/0073790 | A1 | 4/2004 | Ateniese et al. |
| 2004/0139008 | A1 | 7/2004 | Mascavage, III |
| 2004/0153674 | A1 | 8/2004 | Hayashi |
| 2004/0259633 | A1 | 12/2004 | Gentles et al. |
| 2004/0268123 | A1 | 12/2004 | Le et al. |
| 2005/0018853 | A1 | 1/2005 | Lain et al. |
| 2005/0021944 | A1 | 1/2005 | Craft et al. |
| 2005/0091492 | A1 | 4/2005 | Benson et al. |
| 2005/0138374 | A1 | 6/2005 | Zheng et al. |
| 2005/0160095 | A1 | 7/2005 | Dick et al. |
| 2005/0242568 | A1 | 11/2005 | Long et al. |
| 2005/0246533 | A1 | 11/2005 | Gentry |
| 2005/0278542 | A1 | 12/2005 | Pierson et al. |
| 2006/0010324 | A1 | 1/2006 | Appenzeller et al. |
| 2006/0036862 | A1 | 2/2006 | Tuvell et al. |
| 2006/0041752 | A1 | 2/2006 | Tuvell et al. |
| 2006/0050869 | A1 | 3/2006 | Tuvell et al. |
| 2006/0087883 | A1 | 4/2006 | Ozquz et al. |
| 2006/0101273 | A1 | 5/2006 | Tan et al. |
| 2006/0101524 | A1 | 5/2006 | Weber |
| 2006/0242423 | A1 | 10/2006 | Kussmaul |
| 2006/0242696 | A1 | 10/2006 | Cruzado et al. |
| 2006/0282660 | A1 | 12/2006 | Varghese et al. |
| 2006/0294366 | A1 | 12/2006 | Nadalin et al. |
| 2007/0083923 | A1 | 4/2007 | Fluhrer et al. |
| 2007/0115812 | A1 | 5/2007 | Hughes |
| 2007/0165638 | A1 | 7/2007 | Hasani et al. |
| 2007/0179904 | A1 | 8/2007 | Hofstee et al. |
| 2007/0192864 | A1 | 8/2007 | Bryant et al. |
| 2007/0240217 | A1 | 10/2007 | Tuvell et al. |
| 2007/0240218 | A1 | 10/2007 | Tuvell et al. |

(56)  References Cited

U.S. PATENT DOCUMENTS

| | | |
|---|---|---|
| 2007/0240219 A1 | 10/2007 | Tuvell et al. |
| 2007/0240220 A1 | 10/2007 | Tuvell et al. |
| 2007/0240221 A1 | 10/2007 | Tuvell et al. |
| 2007/0240222 A1 | 10/2007 | Tuvell et al. |
| 2007/0266434 A1 | 11/2007 | Reifer |
| 2007/0300290 A1 | 12/2007 | Shay et al. |
| 2008/0022084 A1 | 1/2008 | Raftelis et al. |
| 2008/0022389 A1 | 1/2008 | Calcev et al. |
| 2008/0065882 A1 | 3/2008 | Goodman et al. |
| 2008/0077795 A1 | 3/2008 | MacMillan |
| 2008/0086773 A1 | 4/2008 | Tuvell et al. |
| 2008/0086776 A1 | 4/2008 | Tuvell et al. |
| 2008/0101611 A1 | 5/2008 | Lindholm et al. |
| 2008/0104711 A1 | 5/2008 | Johns et al. |
| 2008/0130889 A1 | 6/2008 | Qi et al. |
| 2008/0130894 A1 | 6/2008 | Qi et al. |
| 2008/0159266 A1 | 7/2008 | Chen et al. |
| 2008/0159299 A1 | 7/2008 | Bu et al. |
| 2008/0172482 A1 | 7/2008 | Shah |
| 2008/0196104 A1 | 8/2008 | Tuvell et al. |
| 2008/0198832 A1 | 8/2008 | Chester |
| 2008/0260151 A1 | 10/2008 | Fluhrer et al. |
| 2008/0320263 A1 | 12/2008 | Nemiroff et al. |
| 2009/0025084 A1 | 1/2009 | Siourthas et al. |
| 2009/0092252 A1 | 4/2009 | Noll et al. |
| 2009/0158417 A1 | 6/2009 | Khanna et al. |
| 2009/0183263 A1 | 7/2009 | McMichael et al. |
| 2009/0228951 A1 | 9/2009 | Ramesh et al. |
| 2010/0037319 A1 | 2/2010 | Steeves et al. |
| 2010/0229224 A1 | 9/2010 | Etchegoyen |
| 2010/0246827 A1 | 9/2010 | Lauter et al. |
| 2010/0296653 A1 | 11/2010 | Richardson |
| 2010/0332400 A1 | 12/2010 | Etchegoyen |
| 2011/0035601 A1 | 2/2011 | Davidson et al. |
| 2011/0082768 A1 | 4/2011 | Eisen |
| 2011/0093503 A1 | 4/2011 | Etchegoyen |
| 2011/0179484 A1 | 7/2011 | Tuvell et al. |
| 2012/0030771 A1 | 2/2012 | Pierson et al. |
| 2012/0042029 A1 | 2/2012 | Tuvell et al. |
| 2012/0150742 A1 | 6/2012 | Poon et al. |
| 2012/0185636 A1 | 7/2012 | Leon et al. |
| 2012/0198234 A1* | 8/2012 | Chung ................... H04L 9/3247 |
| | | 713/176 |
| 2012/0201381 A1 | 8/2012 | Miller et al. |
| 2012/0317028 A1* | 12/2012 | Ansari .................... G06Q 20/28 |
| | | 705/44 |
| 2013/0016729 A1 | 1/2013 | Engel et al. |
| 2013/0067232 A1 | 3/2013 | Cheung et al. |
| 2013/0166729 A1 | 6/2013 | Gole et al. |
| 2013/0179681 A1 | 7/2013 | Benson et al. |
| 2013/0263211 A1 | 10/2013 | Neuman et al. |
| 2013/0268760 A1 | 10/2013 | Bono et al. |
| 2013/0290704 A1 | 10/2013 | Giniger et al. |
| 2013/0291086 A1 | 10/2013 | Pontillo |
| 2013/0326224 A1* | 12/2013 | Yavuz ................... H04L 9/3247 |
| | | 713/176 |
| 2013/0333038 A1 | 12/2013 | Chien |
| 2013/0340052 A1 | 12/2013 | Jakobsson |
| 2014/0059642 A1 | 2/2014 | Deasy et al. |
| 2014/0095894 A1 | 4/2014 | Barton et al. |
| 2014/0115160 A1 | 4/2014 | Tuvell et al. |
| 2014/0156991 A1 | 6/2014 | Baskaran |
| 2014/0250290 A1* | 9/2014 | Stahl .................... H04L 9/3247 |
| | | 713/2 |
| 2014/0250511 A1 | 9/2014 | Kendall |
| 2014/0359729 A1 | 12/2014 | Kreiner et al. |
| 2015/0033027 A1 | 1/2015 | Miller et al. |
| 2015/0096031 A1 | 4/2015 | Benoit et al. |
| 2015/0163121 A1 | 6/2015 | Mahaffey et al. |
| 2015/0227753 A1 | 8/2015 | Callaghan et al. |
| 2015/0347753 A1 | 12/2015 | Tuvell et al. |
| 2015/0363602 A1 | 12/2015 | Willis et al. |
| 2016/0012227 A1 | 1/2016 | Tuvell et al. |
| 2016/0204948 A1 | 7/2016 | Miller et al. |
| 2016/0261416 A1 | 9/2016 | Miller et al. |
| 2017/0213054 A1 | 7/2017 | Chen et al. |

* cited by examiner

| PROTECTED APPLICATION OBJECT | ANTI-REPLAY | ANTI-TAMPER |

VALIDATE
TIMESTAMP

VALIDATE MESSAGE
ID AGAINST CACHE

• IF TIMESTAMP IS TOO OLD
(BEYOND THE THRESHOLD)
DISCARD OPAQUE OBJECT

• LOOK IN MEMORY CACHE FOR
THE MESSAGE ID, AND DISCARD
OPAQUE OBJECT IF FOUND

• DELETE ALL MESSAGE IDs IN THE
CACHE THAT ARE OLDER THAN
THE THRESHOLD VALUE

• ADD (MESSAGEID, TIMESTAMP)
TO CACHE

SDK1,
(42,10:00),
SERVER3

SDK1
(95,9:43)
(18,9:56)
(77,9:58)

SDK2
(61,9:23)
(19,9:59)

```
{
  "encryptedBody": " ... ",
  "header": {
    "data":
"ewogICAgImFudGIsZXBSYXkiOiB7CiAgICAgICAgIm1lc3NhZ2ViYzCiBiCiSMjkyMzMwWxzQiLAogICAgICAgICJ
0aW1IljogIIwMTQtMDctMDNUMDk6MjErMDU6MDAiCiAgICAgICAgIm5veXB0bybl6IHsKICAgIICAgIC
AgICAiYW50aYRhbXBBci1tZCI6ICI6IC15MDg3MDkzMDcIsCiAgICAgICAgIm5FudGIUYW1wZXJNb2RIljogki4LU1zdH
iILAogICAgICAgIChc3IljogIITQTFPNSIsCiAgICAgICAgIm1vZHktbWdiWQiOiAiMDgwNzk2ck4IiwKICAgICAgICAiZW5
jb2RIljogIkJBUOU2NCIsCiAgICAgICAgIm12ljogIlJzODEZOWE5IiwKICAgICAgICAicGVlckVuV1B1YmtlSI6IFsKI
CAgICAgICAgICAgIIzNDIzOTIzOTgzNDUwMxzk3NTgiCiAgICAgICAgICAgICAic2IhbmIsZ1B1YmtleSI
6ICIwOTgwNzA5MMCIsCiAgICAgICAgIIN5bSI6ICJBRVMyNTYiCiAgICAgIC0gfQ0gICAgICCJ3cmFwcGVkVkU3ItsW50Yi1Aog
gIJI5MjMjM5MjMONTUiLAogICAgICAgICJ3cmFwcGVkVkU3ItsW50YiLAogICAgICAgICJ3cmFwcGVkVW5jcmyMzkyMzQ1NSIKICAgIHOK
fQo=",
    "digest": "239223932"
  },
  "integrity": {
    "messageAuthenticationCode": "0",
    "signature": "23089234243",
    "type": "signature"
  }
}
```

FIG. 14A

```
{
  "antiReplay": {
    "messageId": "0.929233034",
    "time": "2014-07-03T09:24:31+05:00",
    {"messageid-history":["0.234987","0.98234","0.27237"]}
  },
  "crypto": {
    "antiTamper-md": "90870978",
    "antiTamperMode": "Ix-Mstr",
    "asym": "RSAES-OAEP",
    "sym": "AES-256-GCM",
    "encode": "BASE64",
    "peerEncPubkey": ["234239239834503975B"],
    "signingPubKeyFingerprint": "09807090",
    "wrappedSymEnckey": ["2923923455"],
    "wrappedSymIntegKey": "0",
    "iv": "238139a9",
    "body-md": "080798",
  }
}
```

FIG. 14B

```
{
{"appObjList":[{"appObj":{...},"appObj":{...}]}
}
```

```
{"registration":

{"publicKey":"7979070987809",
        "status":"new",
        "appID":"839458",   // globally unique AppID
         "pid":"234234"}        // pid = permanentID

}

{"version":["malware x.y.z"]},

{"malwareresult":

{"result":"yes",
        "findings":"["namesofmalware"]}

}

{"rootresult":

{"result":"no",
        "findings":"..."}

}

{"analysisresult":

[{"analysisType":"heartbleed",
        "status":"found",
        "comments":"xyz"}]

```
{"log":
    {"logname":"batterylog",
    "log":"logdata",
    "status":"success"}
}

{"certificatepin":

{
        "cert":"3434",
        "cert-md":"123"}

}

{"malwareSignatureList":

{"version":"4.5.9",
        "timeformat":" ISO8601",
        "time":" 2014-07-03T09:24:31+05:00",
        "entry": [{

"name":" iBanking",
                "hashvalue":" d729230238",
                "installedPackageName":"com.evilsunflower.compass",
                }],

}

}

{"rootSignatureList":

{"version":"8.3.9",
        "timeformat":" ISO8601",
        "time":" 2014-07-03T09:24:31+05:00",
        "entry": [{

"Type":"Super User",
                "Installed Package Name":"com.noshufou.android.su.elite",
                }],

```
{"BadList":

{"version":"4.5.9",
        "timeformat":" ISO8601",
        "time":" 2014-07-03T09:24:31+05:00",
        "entry": [{

"id":"8769867",
                "Provenance":"Tier1FI",
                "Surety":"login denial", "ReasonCode":["released fraudulent transaction","rooted device"],
                }],

}

}

{"GoodList":

{"version":"4.5.9",
        "timeformat":" ISO8601",
        "time":" 2014-07-03T09:24:31+05:00",
        "entry": [{

"id":"7678",
                "ReasonCode":["used in valid transaction"],
                }],

}

}

{"unregister":

```
<saml:Attribute Name="IAWhitelist">
    <saml:AttributeValue>accelerometer</saml:AttributeValue>
    <saml:AttributeValue>location</saml:AttributeValue>
</saml:Attribute>
```

FIG. 19

```
<saml:Attribute Name="MalwareSignaturelist">
    <saml:AttributeValue>
        <malware>org.magicalguru.flashforward</malware>
        <md5>97465b4f74dafd2e584f576a67c5354b</md5>
    </saml:AttributeValue>
    <saml:AttributeValue>
        <malware>com.evilsunflower.xiaoxiaole</malware>
        <md5>6bd9363c5d86e1f75ecb61564513636</md5>
    </saml:AttributeValue>
</saml:Attribute>
```

FIG. 20

```
<saml:Attribute Name="Rootlist">
  <saml:AttributeValue>
    <root>com.noshufou.android.su</root>
    <weight>2</weight>
  </saml:AttributeValue>
  <saml:AttributeValue>
    <root>cfahrbot.apps.rootcallblocker.pro</root>
    <weight>1</weight>
  </saml:AttributeValue>
  <saml:AttributeValue>
    <roottest>
      sync agent ztexl609523 \#xD id \#xD \#x22 hello \#x22 >>
      /data/data/testin.txt \#xD rm /data/data/testin.txt
    </roottest>
    <weight>4</weight>
  </saml:AttributeValue>
</saml:Attribute>
```

FIG. 21

```
<saml:Attribute Name="IABlacklist">
  <saml:AttributeValue>
    <phish>bad@hacker.com</phish>
  </saml:AttributeValue>
  <saml:AttributeValue>
    <phish>verybad@evil.com</phish>
  </saml:AttributeValue>
  <saml:AttributeValue>
    <smish>1-1234567890</smish>
  </saml:AttributeValue>
  <saml:AttributeValue>
    <device>
      <pid>0978008764</pid>
      <provenance>FI-classA</provenance>
      <surety>suspended</surety>
      <reason>fraudulent payment</reason>
    </device>
  </saml:AttributeValue>
</saml:Attribute>
```

FIG. 22

SYSTEMS AND METHODS FOR TRUSTED PATH SECURE COMMUNICATION

CROSS-REFERENCE TO RELATED APPLICATIONS

This application is a continuation of application Ser. No. 17/521,138, filed Nov. 8, 2021, which is a continuation of application Ser. No. 16/784,863, filed Feb. 7, 2020, which is a division of application Ser. No. 16/266,702, filed Feb. 4, 2019, which is a continuation of application Ser. No. 15/000, 913, filed Jan. 19, 2016, which claims the benefit of U.S. Provisional Application No. 62/105,148, filed Jan. 19, 2015, each of which is incorporated by reference in its entirety.

FIELD OF THE INVENTION

This disclosure generally relates to techniques for secure exchange of information between two computing systems and, in particular, to systems and methods that can provide protection against man-in-the-middle and/or man-in-the-machine attacks.

BACKGROUND

An authentication credential is generally considered to be an artifact submitted as a means of identity attestation. An electronic authentication credential is transmitted through a computer network with the purpose of allowing a party to gain access to a remote computer system. A commonly used authentication credential is the password; however, adversaries routinely defeat passwords through keyboard loggers and other techniques. Regulators such as the Federal Financial Institutions Examination Council (FFIEC) permit banks to continue to use passwords, but the banks must augment with additional credentials. Even if an adversary were to defeat one credential, then the additional credentials would constitute further hurdles that would hopefully stop the attack.

Security practitioners typically classify authentication credentials in four broad categories:

Something you know
Something you have
Something you are
Somewhere you are

Best practice recommendation employ an authentication credential from at least two of the first three categories. Service providers such as banks often wish to continue leveraging passwords or other means of proving "something you know" due to their inherently low cost and simple means of distribution; however, in some cases, banks switch from passwords to biometrics such as fingerprint sensors. In response to the FFIEC ruling mandating multi-factor authentication, the second most popular factor employed in on-line banking is "something-you-have" implemented through an identification of the user's machine. If an adversary were to steal a user's password but launch an attack from the adversary's (non-registered) machine, then the adversary would not gain access due to the failure of an authentication credential.

Subsequent to the FFIEC ruling, many banks adopted machine identification. The banks placed a cookie in the user's browser and prohibited access unless the client's machine could prove possession of the cookie. Adversaries quickly learned to defeat the cookie through malware. The FFIEC issued a subsequent ruling that disallowed cookies unless they were augmented with additional controls. Financial Services is one of the first industries to execute the upgrade from one-factor authentication to multiple factors of authentication. Whether user biometrics or machine identification is used for authentication, in both cases, the second factor is something-you-have as offered through human biometric (e.g. user fingerprint, retina scan, etc.) or the machine e-biometric.

SUMMARY

In various embodiments, the techniques described herein can serve the high-security needs of financial services; however, practically any mobile application with a need for security may leverage the solution provided by one or more embodiments. The underlying architecture of the machine e-biometric, in various embodiments, is an infrastructure for financial grade cryptographic services. This infrastructure focuses on secure cryptographic key storage, and implementation of a trusted path built using the cryptographic infrastructure. The client mobile application (client app) compiles and links with the a data-collection module (e.g., a Software Development Kit (SDK)). The trusted path according to some embodiments can securely connect the data-collection module operating within the context of the client application, a remotely located server such as a service provider's, the server residing in a data center, etc.

The trusted path according to some embodiments can protect against unauthorized information disclosure, modification, or replays. These services effectively protect against Man-in-the-Middle, Man-in-the-Application, and other attacks. Using the trusted path according to some embodiments, the data-collection module may provide to the customer and/or another server the information to support a wide variety of information services such as:

Authentication e-biometric
Detection of root or malware infection
Device location
Certificate pinning
Signature based transactions
Device interrogation; and identification of device risk indicators The trusted path according to some embodiments can offer equally secure communication in both directions. Using the channel from the server to the device, the server may deliver information. For example:

Passwords and One-time-passwords
Patterns to search when detecting root or malware infections
Notifications and messages By establishing a highly secure trusted path between the data-collection module and the server, the applications can enjoy the benefits of a secure channel connecting an application to its devices.

Transport Vs. Message:

A Client system such as APPLE Push Network (APN) notification leverages transport-level security, while in various embodiments, a trusted path uses message-level security. Transport and message-layer security each have their respective pros and cons, as highlighted below.

Anti-replay: Transport-layer security generally does not support the concept of message-level anti-replay. If a provider wishes to send an APN notification to an App on a device, then it is the provider's responsibility to ensure that the App does not suffer from replay attacks. Typically, the provider either ignores this problem, or implements a simple message-layer protocol. In contrast, in some embodiments, a trusted path implements anti-replay in the infrastructure.

When using trusted path according to some embodiments, the provider never needs to be concerned with replay attacks.

Non-repudiation: Transport-layer security does not support the concept of non-repudiation. European banks, in particular, like to use non-repudiation. However, the concept is beginning to catch-on globally within financial services. Signature based authentication facilitated via a trusted path can support non-repudiation.

Encryption gaps: Client APN implements a star architecture where providers communicate with the Client APN service over a link protected with transport-level security; and Client APN communicates with the devices using transport-level security. The APN service itself is a point where messages are decrypted and re-encrypted leaving a gap of cleartext. In contrast, a trusted path in various embodiments has no cleartext gap. Financial regulators such as the Hong Kong Regulatory Authority explicitly require end-to-end security for inbound authentication credentials.

Universal channel: Client APN does not support a network-independent notification channel. The provider must use one infrastructure to send notifications to iOS devices, and a second infrastructure for Android. Using a trusted path according to some embodiments, the provider may use a unified service and a channel that can support various platforms.

Size limitations: Client APN implements a store-and-forward messaging service on top of the transport connection. This store-and-forward messaging service typically has a size limitation of 2K per message. In contrast, in some embodiments, a trusted path generally has no message size limit. The Trusted Path's size freedom effectively implies that various embodiments can support machine-machine notifications as well as machine-to-human notifications. For example, a server may distribute non-size-constrained, typically large (e.g. several megabytes), malware signature files through its notification service.

Transport Layer Security (TLS) failures: In recent years, security researchers uncovered holes in Secure Socket Layer (SSL)/TLS. When the holes were uncovered, the financial industry reacted with emergency patches which turned out to be expensive. In some embodiments, a trusted path does not depend upon SSL/TLS security.

Certificate independence: Client APN implements a single certificate on the device. Using bundles and tokens as identifiers, a message-level protocol routes messages to applications. In contrast, a server according to some embodiments uses per-application certificates. If one certificate were compromised, then there would generally be no impact upon the other certificates used by other applications.

Privacy: An APN provider may potentially attempt to send a message to an application residing on the device which has been disabled or possibly removed. The Client APN infrastructure has a copy of this message in the clear text form which cannot be delivered. In contrast, if a user removes an App on the device, or temporarily disables the App by wiping the App's cryptographic keys, then it is cryptographically impossible to decrypt an outbound message transmitted using systems according to some embodiments. European financial regulators are especially concerned with a user's ability to disassociate him or herself from a bank.

Software dependency: If Client APN wishes to add anti-replay, non-repudiation, and high-grade privacy into its infrastructure, then APN would need to implement message-level security services on top of APN which would be similar to those services that the trusted path according to some embodiments provides.

Channel universality: Client APN establishes an infrastructure for outbound communication. The providers need a different infrastructure for inbound communications. In contrast, in some embodiments, a trusted path unifies a single infrastructure and key management facility over inbound and outbound communication, which operates across both iOS and Android.

Accordingly, in one aspect, a method is provided for secure exchange of information between a user device and a server. The method includes the steps of: (a) generating by a data-collection module associated with a user device a secured object. The secured object includes: (i) an information object having information to be transmitted to a server; (ii) a header object having an anti-replay header, an anti-tamper header, or both; and (iii) an integrity object having a signature associated with the information object. The method also includes (b) transmitting, via a client app associated with the data-collection module, the secured object to the server. The transmission can occur between the user device and the server directly, or through one or more trusted and/or untrusted intermediaries.

The information object may include one or more of: a rooted device detection result, a malware detection result, a debugger-emulator attachment result, a crimeware detection result, and a location of the user device. In some embodiments, the method further includes determining by the data-collection module one or more of whether: the user device is rooted, using a root-signature list, providing a rooted device detection result; the user device and/or the client app is affected by malware, using a malware signature list, and providing a malware detection result; and whether a debugger and/or an emulator is attached to the client app, the data-collection module, and/or a security module associated with the data-collection module, providing a debugger-emulator attachment result.

In some embodiments, the method includes encrypting the information by the data-collection module and/or a security module associated with the data-collection module, to produce encrypted information. The information object may include the encrypted information. The method may include accessing by the data-collection module from the user device the information to be transmitted to the server. The information may include one or more of: (i) a fingerprint of the user device, which can be a device ID or device related information that may be used to assign a device ID, (ii) a location of the user device, and (iii) a certificate corresponding to a client app that is installed on the user device and that is associated with the data-collection module.

In some embodiments, the method may include exchanging by the data-collection module with a security module, a data element. The security module is associated with both the data-collection module and the user device. The data element may include one or more of: (i) a public key of the server, for encrypting the information to be transmitted, (ii) a private key of the data-collection module, for generating the signature, (iii) an identifier of the user device, and (iv) a location of the user device. The method may also include encrypting by the security module the data element using a first level storage key; storing by the security module, the encrypted data element in a file in a sandbox associated with the client app; encrypting the first level storage key using a second level storage key or a master key; and storing the encrypted first level storage key in another file in the sandbox. The first level storage key may be encrypted using the second level storage key, and the method may further include encrypting the second level storage key using the master key; and storing the encrypted second level storage key in yet another file in the sandbox. The method may further include dynamically generating the master key by the security module. Additional levels of storage keys may be used between the first and second levels of storage keys.

In some embodiments, the method further includes encrypting by another security module that is also installed on the user device and that is associated with another client app installed on the user device, another data element using another first level storage key; storing by the other security module, the encrypted other data element in a file in another sandbox associated with the other client app; encrypting the other first level storage key using another second level storage key or another master key associated with the other client app, where the other master key is unable to decrypt any key not encrypted by that other master key; and storing the encrypted other first level storage key in another file in the other sandbox. In this way, one client app cannot access information corresponding to another app even though both apps are installed on the same user device. The method may include, upon a request from the data-collection module, providing thereto the data element in an unencrypted form.

In some embodiments, generating the anti-replay header includes generating a message identifier; and forming the anti-replay header by including therein: (i) the message identifier, and (ii) (A) a time of collection of the information to be transmitted, and/or (B) a time of transmission of the encrypted information. Generating the anti-tamper header may include computing a message digest for one or more of: the information object; the anti-replay header; the anti-tamper header; the data-collection module; and the client app. Generating the signature may include: encrypting a message digest associated with the information object; and encrypting a message digest associated with one or more of: the anti-replay header; the anti-tamper header; the data-collection module; and the client app.

In another aspect, a system is provided for allocating data structures to a number of processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The user device may include the processing unit.

The instructions in the first memory configure the processing unit to operate as a data-collection module, where the data-collection module is programmed to: (a) generate a secured object, and (b) transmit, via a client app associated with the data-collection module, the secured object to the server. The secured object includes: (i) an information object having information to be transmitted to a server; (ii) a header object having an anti-replay header, an anti-tamper header, or both; and (iii) an integrity object having a signature associated with the information object. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to a number of processing nodes, where each processing node has a respective local memory. The user device may include the processing unit.

The instructions in the first memory configure the processing unit to operate as a data-collection module, where the data-collection module is programmed to: (a) generate a secured object, and (b) transmit, via a client app associated with the data-collection module, the secured object to the server. The secured object includes: (i) an information object having information to be transmitted to a server; (ii) a header object having an anti-replay header, an anti-tamper header, or both; and (iii) an integrity object having a signature associated with the information object. In various embodiments, the instructions can program the processing unit to perform one or more of the method steps described above.

In another aspect, a method is provided for secure exchange of information between a user device and a server. The method includes the steps of: (a) receiving by a client app installed on a user device a secured object. The secured object includes: (i) an information object having information to be received by the client app and/or a data-collection module associated therewith, (ii) a header object having an anti-replay header and/or an anti-tamper header, and (iii) an integrity object having a signature associated with the information object. The method also includes (b) validating by the data-collection module the information object based on the signature; and (c) performing by the data-collection module an anti-replay check, and/or an anti-tamper check.

The information to be received may include information transmitted by a server. Additionally or in the alternative, the information to be received may include encrypted information, and the method may further include decrypting by the data-collection module the information object. In some embodiments, the information to be received includes one or more of: an encryption key, a root-signature list having a list of software modules indicative of a rooted user device, and a malware signature list. In some embodiments, the information to be received includes a biometric configuration file, and the method may include obtaining by the data-collection module biometric information according to the biometric configuration file.

In some embodiments, the method further includes exchanging a data element between the data-collection module and a security module. The data element may include one or more of: (i) a private key of the data-collection module, for decrypting the information object, (ii) a public key of the server, for validating the information object using the signature, (iii) at least a part of a message identifier history used in performing an anti-replay check, and (iv) a certificate associated with the client app. The method may include encrypting by the security module the data element using a first level storage key; storing by the security module, the encrypted data element in a file in a sandbox associated with the client app; encrypting the first level storage key using a second level storage key or a master key; and storing the encrypted first level storage key in another file in the sandbox. The first level storage key may be encrypted using the second level storage key, and the method may further include encrypting the second level storage key using the master key; and storing the encrypted second level storage key in yet another file in the sandbox.

In some embodiments, the method includes encrypting by another security module that is also installed on the user device and that is associated with another client app installed on the user device, another data element using another first level storage key; storing by the other security module, the encrypted other data element in a file in another sandbox associated with the other client app; encrypting the other first level storage key using another second level storage key or another master key corresponding to the other client app, the other master key being unable to decrypt any key not encrypted by that other master key; and storing the encrypted other first level storage key in another file in the other sandbox. As such, one client app may not access information corresponding to another app even though both apps are installed on the same user device. The method may also include dynamically generating the master key by the security module and/or upon a request from the data-collection module, providing thereto the data element in an unencrypted form.

Performing the anti-replay check may include accessing a message time from the anti-replay header and notifying to the client app that the information object is invalid, if the message time is older than a specified threshold. Otherwise, the method may include accessing a message identifier from the anti-replay header and notifying to the client app that the information object is invalid, if the message identifier is located in a cache or history of message identifiers. If the message identifier is not located in the cache/history, the method may include storing the message identifier in the cache/message identifier history; and notifying the client app that the information object is not replayed.

In some embodiments, performing the anti-tamper check includes: computing by the data-collection module a message digest for the anti-replay header and/or the anti-tamper header; comparing the message digest with a corresponding message digest obtained from the signature; and notifying validity of the secured object to the client app according to a result of the comparison, e.g., if the comparison results in an exact match.

In some embodiments, the method further includes determining by the data-collection module one or more of whether: the user device is rooted, using a root-signature list; whether the user device and/or the client app is affected by malware, using a malware signature list; and whether a debugger and/or an emulator is attached to the client app, the data-collection module, and/or a security module associated with the data-collection module.

In some embodiments, the secured object: (i) may include the root-signature list and/or the malware signature list, and (ii) may be uploaded to a networked computer. Receiving the secured object may include downloading the secured object from the networked computer.

The method may include logging by the data-collection module information to be sent to a server. The information object may include a set of types of information to be logged; and the data-collection module may log information only of the types in that set.

In another aspect, a system is provided for allocating data structures to a number of processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The user device may include the processing unit.

The instructions in the first memory configure the processing unit to operate as a data-collection module, where the data-collection module is programmed to: (a) receive by a client app installed on a user device a secured object. The secured object includes: (i) an information object having information to be received by the client app and/or a data-collection module associated therewith, (ii) a header object having an anti-replay header and/or an anti-tamper header, and (iii) an integrity object having a signature associated with the information object. The instructions also program the data-collection module to: (b) validate the information object based on the signature; and (c) perform an anti-replay check, and/or an anti-tamper check. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to a number of processing nodes, where each processing node has a respective local memory. The user device may include the processing unit.

The instructions in the first memory configure the processing unit to operate as a data-collection module, where the data-collection module is programmed to: (a) receive by a client app installed on a user device a secured object. The secured object includes: (i) an information object having information to be received by the client app and/or a data-collection module associated therewith, (ii) a header object having an anti-replay header and/or an anti-tamper header, and (iii) an integrity object having a signature associated with the information object. The instructions also program the data-collection module to: (b) validate the information object based on the signature; and (c) perform an anti-replay check, and/or an anti-tamper check. In various embodiments, the instructions can program the processing unit to perform one or more of the method steps described above.

In another aspect, a method for facilitating secure exchange of information between a user device and a server, includes the steps of: storing by a security module a data element in a file in a sandbox corresponding to a client app, in an encrypted form. The security module may be associated with a data-collection module that is associated with both the client app and a user device. The method also includes, upon request from the data-collection module, providing thereto the data element in an unencrypted form.

In some embodiments, the method includes encrypting by the security module the data element using a first level storage key; encrypting the first level storage key using a second level storage key or a master key; and storing the encrypted first level storage key in another file in the sandbox. An encryption procedure used for encrypting the data element may be different from an encryption procedure used for encrypting the storage key. The method may also include dynamically generating the master key. In some embodiments, the method includes dynamically generating by another security module that is associated with the user device and with another client app installed on the user device, another master key corresponding to the other client app. The other master key may be unable to decrypt any data not encrypted by that master key. A different sandbox may be associated with each client app and the storage/master keys used to store different data elements corresponding to different client apps in their respective sandboxes may be different. As such, one client app may not access another client app's data element(s) even though the two client apps are installed on the same user device. The security module may be obfuscated. For example, the security module may include one or more obfuscating code segments.

9

10

The data element may include one or more of: a public key of a server, for encrypting information to be transmitted via the client app to the server; a private key of the data-collection module, for generating a signature for the information to transmitted; an identifier of the user device; a location of the user device; a private key of the data-collection module, for decrypting information received by the client app; a public key of the server, for validating information received therefrom using a signature transmitted by the server; a message identifier history used in performing an anti-replay check; a root-signature list, used in determining whether the user device is rooted; a malware signature list, used in determining whether the user device contains malware; and a certificate associated with the client app.

In another aspect, a system is provided for allocating data structures to a number of processing nodes, where each processing node has a respective local memory. The system includes a first processor and a first memory in electrical communication with the first processor. The first memory includes instructions that can be executed by a processing unit including the first processor or a second processor, or both. The processing unit may be in electronic communication with a memory module that includes the first memory or a second memory or both. The user device may include the processing unit.

The instructions in the first memory configure the processing unit to operate as a security module, where the security is programmed to: store a data element in a file in a sandbox corresponding to a client app, in an encrypted form. The security module may be associated with a data-collection module that is associated with both the client app and a user device. The instructions also program the security module to, upon request from the data-collection module, provide thereto the data element in an unencrypted form. In various embodiments, the instructions can program the processing unit to perform one or more of the method steps described above.

In another aspect, an article of manufacture is provided that includes a non-transitory storage medium having stored therein instructions which, when executed by a processing unit program the processing unit, which is in electronic communication with a memory module, to allocate data structures to a number of processing nodes, where each processing node has a respective local memory. The user device may include the processing unit.

The instructions in the first memory configure the processing unit to operate as a security module, where the security module is programmed to: store a data element in a file in a sandbox corresponding to a client app, in an encrypted form. The security module may be associated with a data-collection module that is associated with both the client app and a user device. The instructions also program the security module to, upon request from the data-collection module, provide thereto the data element in an unencrypted form. In various embodiments, the instructions can program the processing unit to perform one or more of the method steps described above.

BRIEF DESCRIPTION OF THE DRAWINGS

In the following description, various embodiments of the present invention are described with reference to the following drawings, in which:

FIG. 14A shows an example format of a secure object;

FIG. 14B illustrates BASE64 encoding of a JSON structure;

FIG. 16B provides example "appObj" forms;

FIG. 16C provides further example "appObj" forms;

FIG. 16D provides further example "appObj" forms;

FIG. 19 shows an example Whitelist;

FIG. 20 depicts a Malware Signature List;

FIG. 21 shows an example of a Root Signature List; and

FIG. 22 depicts an example Blacklist.

DETAILED DESCRIPTION

Figure 1:
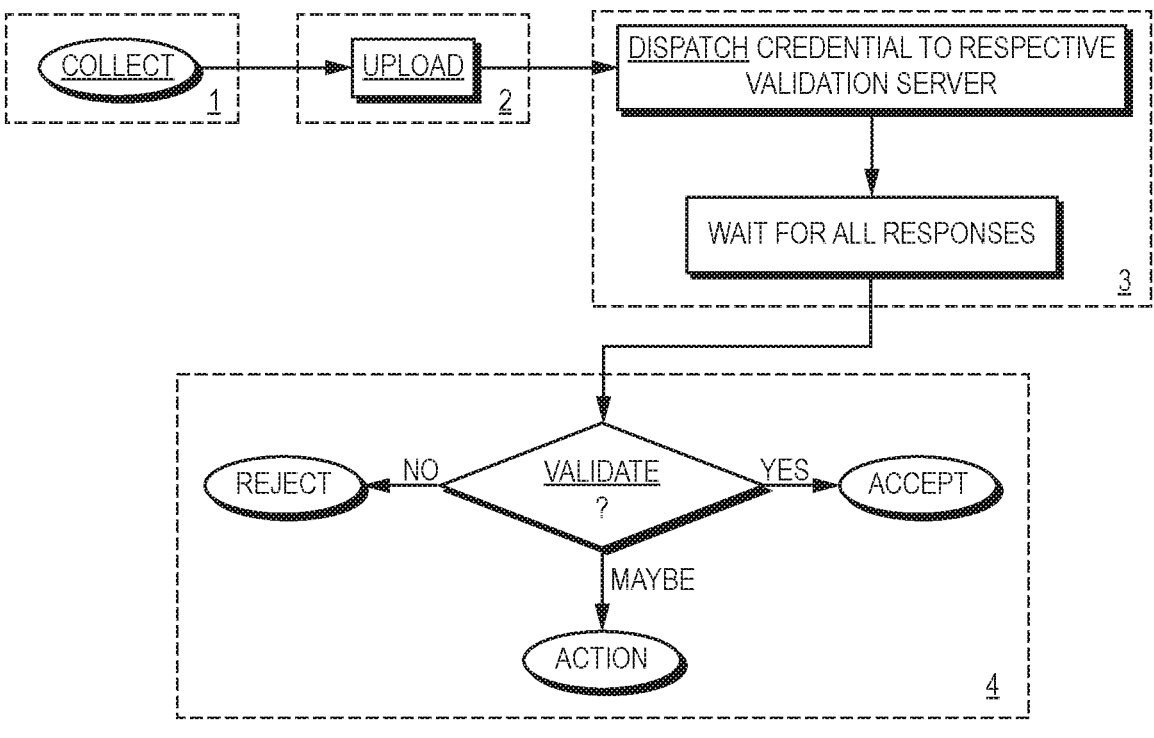
FIG. 1 illustrates a reference authentication flow depicting a bank's credential validation service, according to one embodiment.

FIG. 1 illustrates a reference authentication flow depicting a service provider's, e.g. a bank's credential validation service, according to some embodiments. The steps of the flow include:

1. On the user's device, the bank collects authentication credentials.

2. The user's device uploads the authentication credentials to the bank.

3. Upon reception of the authentication credentials, the bank routes the credentials to a dispatcher and waits for a response. The dispatcher sends each individual credential to its respective validation service.

4. Upon receipt of the responses from the validation services, the bank performs a risk analysis. In some embodiments a simple analysis producing a Boolean result is produced. In some embodiments a risk-based action depicted on the flow chart as "maybe" is offered.

Example actions include requesting an additional authentication credential, or limiting access to only a small collection of banking services, etc.

Figure 2:
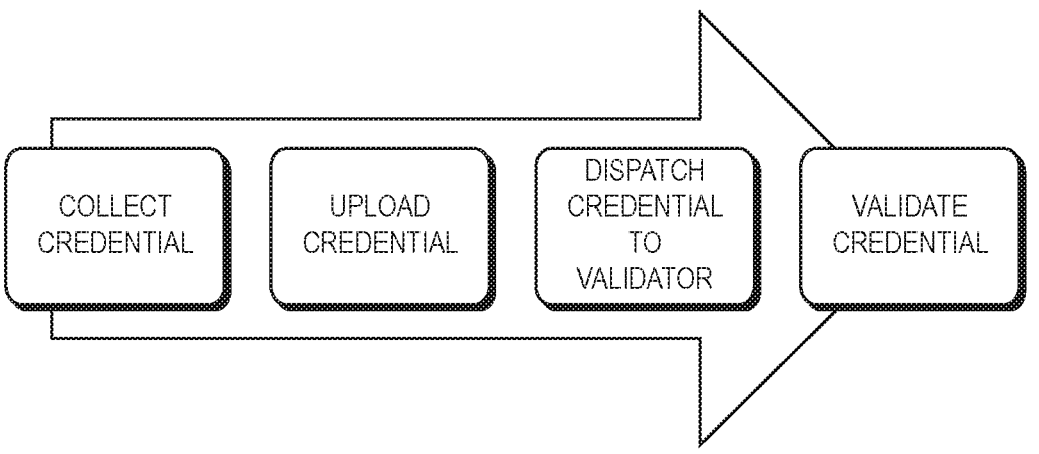
FIG. 2 illustrates the reference flow of FIG. 1 from the perspective of a process.

FIG. 2 illustrates the reference flow from the perspective of a process. The architecture of some systems described herein conforms to this process.

Figures 3, 4:
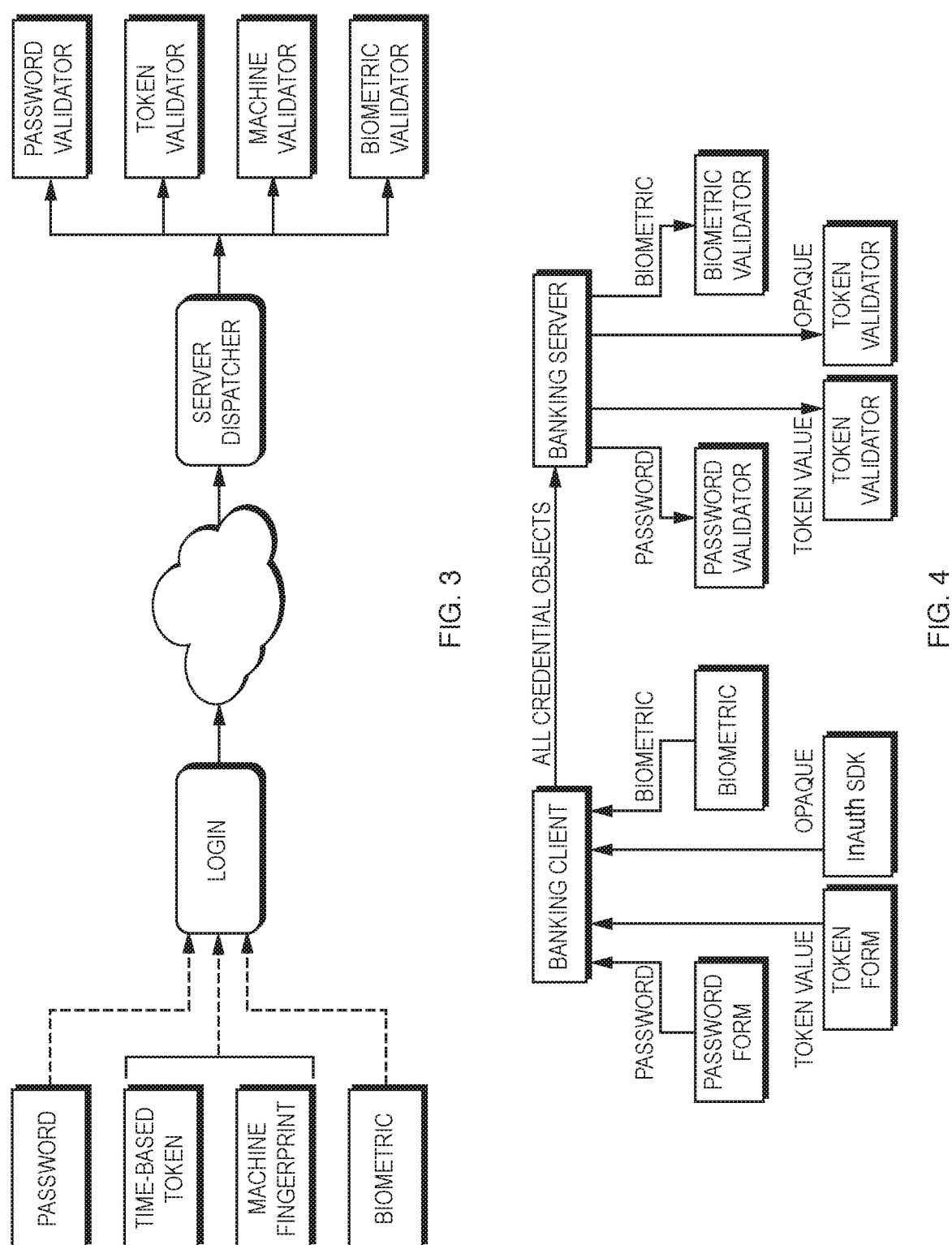
FIG. 3 illustrates an example user authentication based on the reference process illustrated in FIG. 1.
FIG. 4 expands detail of the example by introducing an object flow, according to some embodiments.

FIG. 3 illustrates an example bank which implements the reference process shown in FIG. 2. For illustrative purposes, assume that the example bank authenticates using multiple different types of credentials. The example bank proves that the user has "something-you-know" by requiring a password; the bank authenticates two separate credentials for "something-you-have" through both a time-based token such as RSA SecurID or Vasco token and additionally validates the machine fingerprint; and the bank validates "something-you-are" through a biometric. Regardless of the type of credential, the bank conforms to the reference process for collecting, uploading, dispatching, and validating the credential.

First the bank collects the credential through processes executed on the user's device:

Password: prompt the user to fill out a form field.

Token: prompt the user to fill out a form field by copying the current value presented on the token.

Machine identifier: automatically interrogate the device to extract the fingerprint Biometric: Ask the user to make a sound, present a thumbprint, or perform the other action necessary for the biometric.

Second, the user's device uploads all of the credentials through the network to the bank's servers. Third, the bank's authentication server operates as a dispatcher which routes each credential to its validation server and waits for a response. Fourth, the bank's individual authentication processes validate. The password service forms a message digest of the submitted password and compares against the message digest in the database; the token validator uses the current time and the token value submitted by the user for comparison with a vendor generated reference value; the machine fingerprint validates against a fingerprint authentication server; and the biometric checks against the biometric server.

The results pass back to the dispatcher which consolidates the individual validations and produces a response. Some banks implement a binary pass/fail response to the login. These banks only allow the login request to be processed if all credentials validate. In some embodiments, a bank (a service provider, in general) can offer a "maybe" response which precipitates a risk-directed action. For example, the bank may permit the requested login but disable some risky services. The machine fingerprint is one of possibly multiple authentication credentials.

FIG. 4 expands detail of the example by introducing the object flow. Each authentication credential has a unique object that passes through the system. The objects in the example are Password, Token value, a secured object (e.g., InAuth's Opaque Object), and Biometric, produced by the password form field, token form field, an interrogator of a data-collection module, and Biometric collector, respectively. Next, the banking client uploads all of these credential objects to the banking server for further validation.

Embodiments of the secured object and the embodiments of the data-collection module are discussed in detail below. In addition to validating the machine fingerprint, in some embodiments the validation server may also provide one or more of the following services:

Anti-root check: Provide a risk-based authentication credential which explains whether the mobile device may have been rooted.

Anti-malware status: Provide a risk-based authentication credential which shows whether dangerous malware may exist on the device.

Location-check: Provide a risk-based authentication credential which can validate a user's location data.

Figure 5:
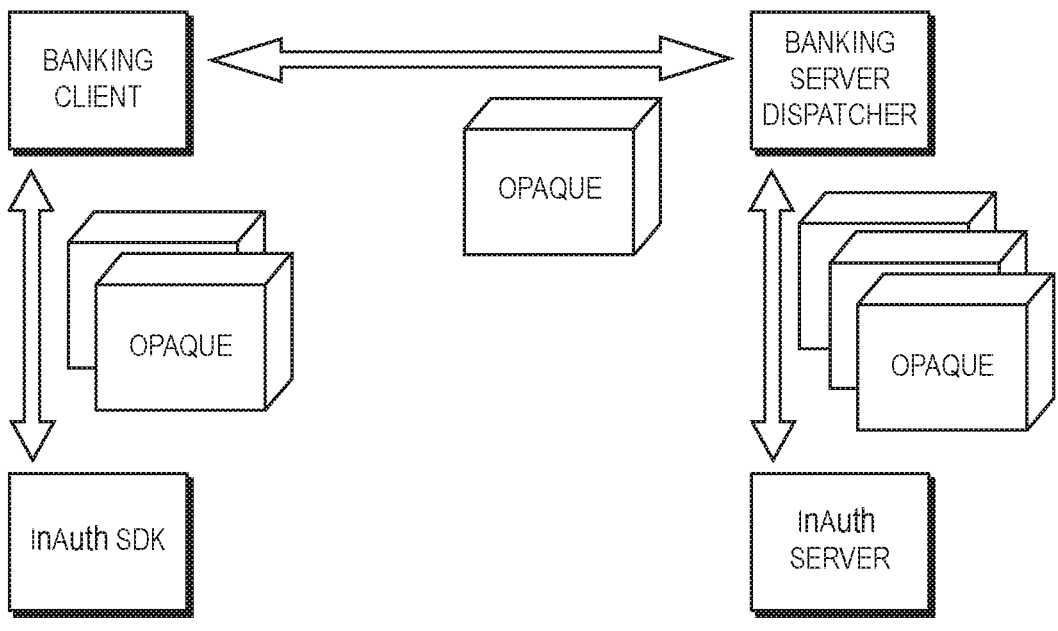
FIG. 5 illustrates a data-collection module and a client app communicating using secured objects, according to some embodiments.

In some embodiments, the data-collection module and the client app (e.g., the Banking Client) installed on a user device may communicate through secured objects as illustrated in FIG. 5. A user device may include a phone, a smart phone, a tablet computer, a laptop, a desk top, a mobile computing device, a custom point-of-sale device, a device in the Internet of things, etc. The secured objects are self-contained units of information designed to provide protection against data leakage, unauthorized tamper, and/or replay. This means that some embodiments of the secured objects can resist man-in-application and man-in-middle attacks.

In some embodiments, the data-collection module acts in a capacity of a library which either produces secured objects as returns to method invocations from the Banking Client; or accepts secured objects submitted from the Banking Client. In the second case, the secured object would have been manufactured by the a server such as a bank server, an authentication server, etc., and passed in the reverse direction through the Banking Server Dispatcher to the Banking Client, and then to the data-collection module. Although the Server Dispatcher and the Banking client have physical access to the secured objects that they forward, the internal security of the secured object prevents any attack launched from these or any other intermediaries.

As described above, some service providers employ simple means of authentication such as passwords and hardware tokens. However, some of the modem forms of authentication may be more complex because they employ calibration. Biometrics and malware detection are two example types of authentication which may need calibration. In some embodiments, the calibration step provides a reverse flow from the server to the collector (the data-collection module) which impacts the means by which the collector operates. For example, in a facial recognition biometric system, the server may provide indication that the user may have accidentally placed his or her finger over the lens. The collector responds with a visual indicator to the user to retry. In a malware detection system, the server may produce configuration files which explain to the malware detector implemented as part of a data-collection module on a client device the list of malware signatures for which to scan. In some embodiments, crimeware detection is provided by a data-collection module, providing crimeware detection result(s).

While integrating with an authorization server, the service provider may determine a policy for calibration. The service provider can implement the mechanism through invocations of methods on the authorization server and/or on the data-collection module to produce and consume secured objects that carry malware signatures, respectively. For example, in some embodiments, suppose a bank's policy is to ensure that the malware signature is not more than one-week old. When the user opens the banking application, the application executes a method on the data-collection module to determine the age of the current malware signature. The data-collection module looks into its encrypted and protected files within the application sandbox for a non-volatile cache of the malware signature file, and then returns a result. If the malware signature file does not exist or is more than a week old, then the Banking Client sends a request to the Banking Server. The Banking Server queries the authentication server for a secured object containing the latest signature file. The Banking Server then returns this secured object to the Banking Client; and the Banking Client submits this secured object to the data-collection module through a method invocation. In general, a sandbox of a client app is a portion of the file system of the user device which is accessible only by the corresponding app. In general, no other app may view or access another app's sandbox without breaking security.

As a performance optimization, the authentication server may load its most current secured object containing the signature file on an externally-accessible web server. External users may download the secured object whenever they wish without requiring a method call into the Server. However, these external users may not open or modify the secured object due to the Secured Object's internal cryptographic protection mechanisms described below. Nevertheless, the external user may load the secured object into the data-collection module prior to the point that the user manually opens the banking application.

Figure 6:
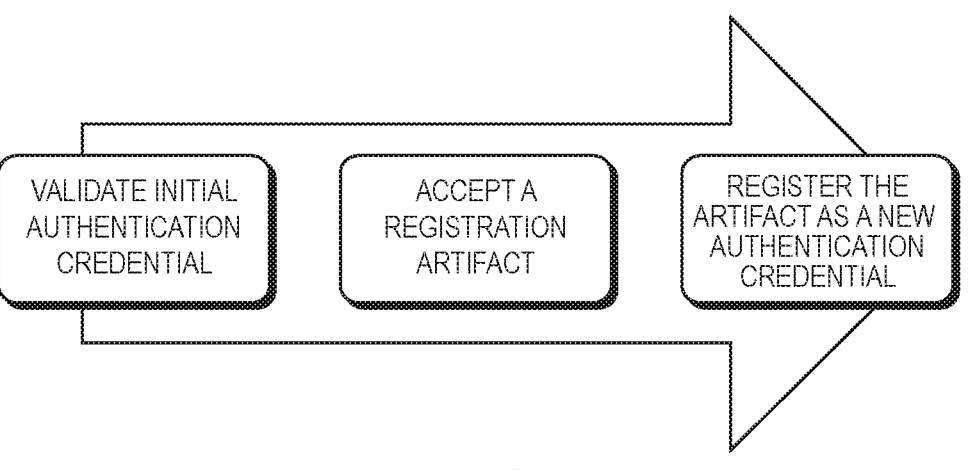
FIG. 6 illustrates credential registration, according to some embodiments.

The reference credential validation process depicted in FIG. 2 is one of two types of processes implemented by the bank. The second type of process is registration. Many users are familiar with new password or forgotten password flows. Typically, the bank prompts the user for some type of an initial authentication credential, e.g., challenge questions, externally-obtained password or QR code, confirmation of offline response through e-mail or text message, Social Security number, or amount displayed on last banking statement. Upon a successful response to the initial authentication credential, the bank executes the credential registration as illustrated in FIG. 6.

Credential registration, according to some embodiments, conforms to the reference credential registration process. A client app installed on a user device (e.g., a Banking Client) submits a request to the data-collection module requesting a secured object containing a registration message. The client app uploads the secured object to the Banking Server; and the Banking Server submits the secured object into the server which completes the registration.

Mobile Client Software Layers

Figure 7:
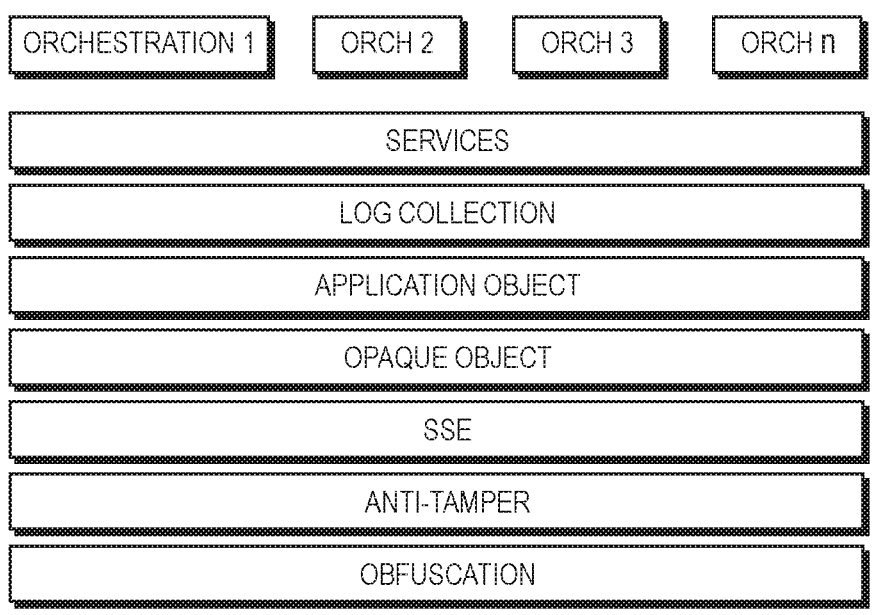
FIG. 7 illustrates the software layers implemented on a mobile user device, according to some embodiments.

FIG. 7 illustrates the software layers implemented on the mobile client.

Obfuscation: Obfuscation is a technology which operates over software. An adversary cannot easily ascertain the programming logic of obfuscated code. The scope of the obfuscation layer usually covers executable software such as the client app installed on a user device (e.g. a smart phone, tablet, computer, etc.) and/or the data-collection module and one or more components thereof. The obfuscation layer may not obscure data.

Anti-Tamper: The anti-tamper solution protects against an adversary who modifies the banking application or the data-collection module. The scope of the anti-tamper layer also typically covers executable software. The anti-tamper layer may not protect against data tampering. This layer generally prevents changing and/or replacement of authorized executable code. Alternatively or in addition, some embodiments provide for detection of any tampering with the client app and/or data-collection module and/or can provide validation that the executable software was not tampered with, as discussed below.

Security Module: In some embodiments, a security module (e.g., InAuth Soft Security Element) is associated with a data-collection module. The security module may provide cryptography and/or non-volatile key storage services.

Cryptographic Keys

Figure 8:
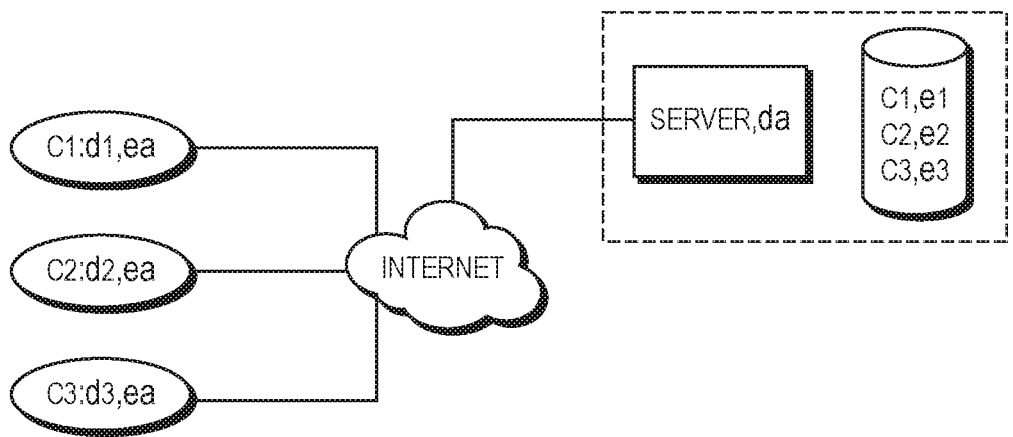
FIG. 8 illustrates establishment of cryptographic keys between a client app/data-collection module/security module and a service provider's server and/or an authentication server, according to some embodiments.

FIG. 8 illustrates the use of cryptographic keys according to some embodiments. The left of the diagram illustrates three mobile devices labeled C1, C2, and C3, respectively. Within the sandbox of the banking application of each device is a private key of an asymmetric key pair. For example, within C1's sandbox is its private key d1; C2 holds its private key d2; and C3 has its private key d3. Additionally, each device's sandbox also holds the public key of the banking server. The diagram also shows that all of the devices hold exactly the same public key because in FIG. 8, the clients depicted are the clients of the same service provider (i.e., the bank, in this example).

Figure 9:
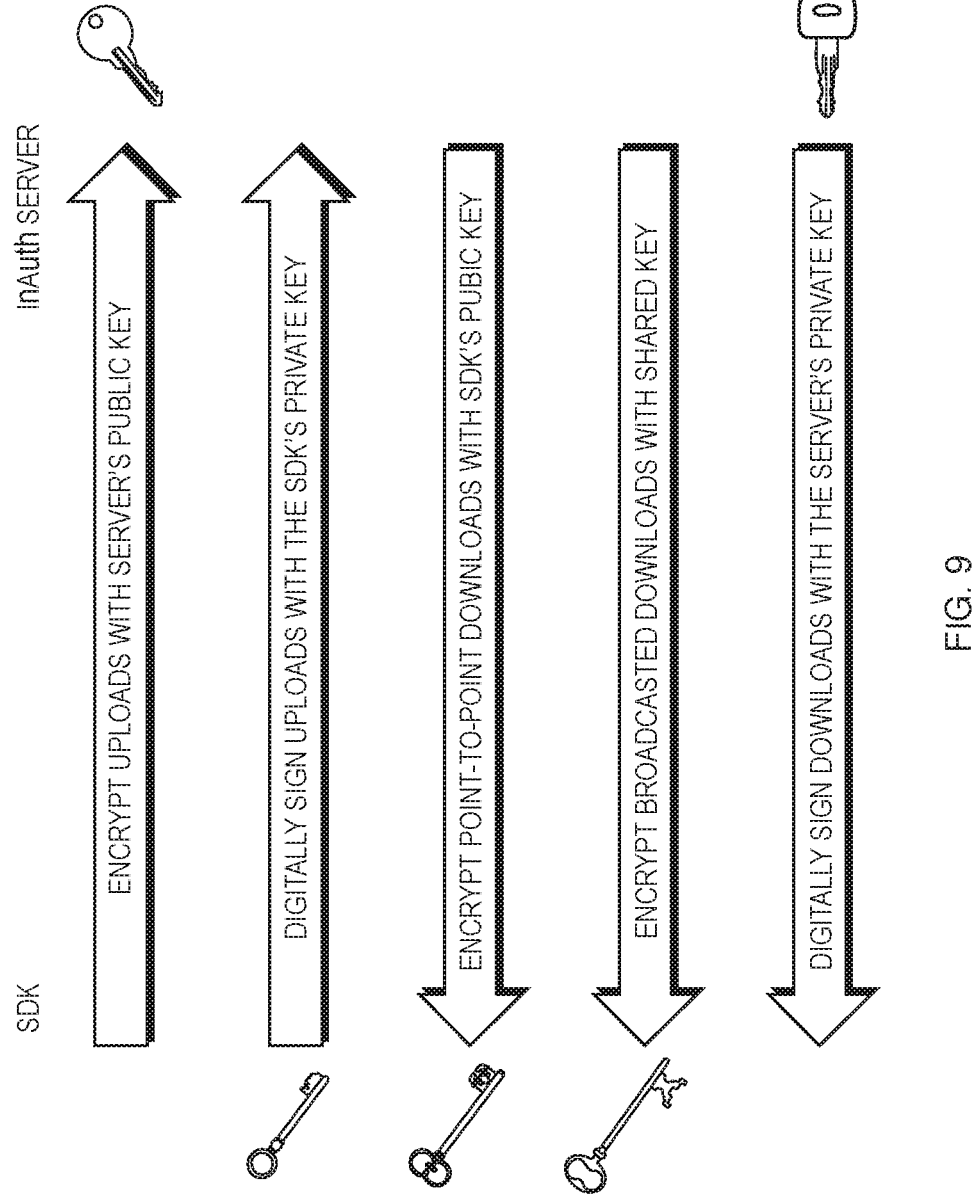
FIG. 9 illustrates the use of cryptographic keys, according to some embodiments.

The right of the diagram depicts the banking server. The banking server maintains a database (directory) which holds the public key associated with each client. For example, if a fourth client were to onboard, then the result of the registration sequence would be an installation the fourth public key into the banking server's database (directory). FIG. 9 depicts the user of private and public keys for encrypting information and for digitally signing information by the client app/data-collection module/security module and by the servers, according to various embodiments.

While the architecture may assume that the environment adequately protects the servers, one may not impose a similar assumption upon the clients. Rather, the clients reside outside of the bank's security perimeter and may be subject to attacks, abuse, and malware. In defense, in some embodiments, the security module protects the keys stored on each client as described below. The objectives of a security module may include one or more of, The private key, di, must not leak out of the security module. Even if the adversary were to bypass device security by rooting the device, the adversary would encounter considerable difficulty when working to discover a private key.

An adversary should not gain the ability to tamper with the contents of a sandbox of a client app with the objective of modifying or substituting the private key.

An adversary should not gain the ability to tamper with the contents of a sandbox with the objective of modifying or substituting the server's public key.

The security module can store cryptographic keys in either volatile or non-volatile storage. The location of the non-volatile storage is typically the application's, i.e., a client app's sandbox. Although a service provider's application has access to the sandbox, the security module's secure storage provides a means to protect against man-in-application attacks. Secure storage leverages keys which are not available to the application; and the Secure Storage layer may enjoy the benefit of protection through the underlying obfuscation and/or anti-tamper layers.

The following list presents the services offered by the security module, according to some embodiments:

Asymmetric key pair generation

Asymmetric cryptographic encryption/decryption

Digital signature/validation

Symmetric key generation

Symmetric key wrapping/unwrapping

Symmetric encryption/decryption

Secure non-volatile storage/retrieval in the applications sandbox

Serialization/deserialization of asymmetric key into secure non-volatile storage container.

In some embodiments, the programming languages used to implement the security module are C and C++. The underlying obfuscation and anti-tamper layers can be effective when protecting software constructed using low level languages. Various other programming languages may also be used to implement the client app, the data-collection module associated therewith, and/or the secure module associated with the data-collection module.

Non-Volatile Storage

In various embodiments, the architecture described herein can provide protection against rooted devices and/or man-in-application-attacks. The nonvolatile storage protection offered by the operating system is often not sufficient. For example, the data-collection module may reside within the context of a rooted device or compromised client application. As such, in some embodiments, the security module implements its own mechanism to protect various keys and/or other information.

In some embodiments, the security module defines three levels of keys:

Data keys

Storage keys

Master keys

In other embodiments, one, two, or more than three levels of keys may be used. A key used by any layer above the security module is a data Key. No upper layer can detect the existence of either storage keys or Master Keys. The security module stores each data key in a signed and encrypted file within the application's sandbox. The security module uses storage keys to sign and encrypt the files containing the data keys. No two data keys may reside in the same file.

The security module stores each storage key in a signed and encrypted file within the application's sandbox. The security module uses a master key to sign and encrypt the Storage key. In various embodiments, the master key does not exist in any non-volatile storage. Rather, the security module generates the master key dynamically. However, the dynamic generation method always yields the same results upon every iteration. This means that no hardcoded key exists that may be subject to static code analysis. Rather, the adversary must trace the execution sequence of the security module in order to discover the master key, making the detection thereof difficult.

In some embodiments the security module defines four or more levels of keys as follows:

Data key

Storage 1 keys

Storage 2 keys

. . .

Storage n keys

Master keys

The security module may use storage keys 1 to sign and encrypt the files containing the data keys. The security module may use storage keys i+1 to sign and encrypt the files containing the information signed and encrypted by storage key i. The security module may use the master keys to sign and encrypt the information signed and encrypted by storage key n, where n is the largest level of a storage key.

Secured Object

The data-collection module and the authorization server communicate using secured objects transmitted directly between these two entities or indirectly through one or more possibly untrusted intermediaries. Upon reception of a secured object, the receiver can validate that object in accordance to the process depicted in FIG. 10.

First, the recipient receives the secured object. Next, the recipient decrypts to discover the underlying message. Next, the recipient validates the digital signature, and lastly, the recipient validates the anti-replay information. If all the validations succeed, then the recipient accepts the message. Otherwise, the recipient returns an exception to its invoker and discards the message without further processing. The errors do not automatically propagate across the network to the peer, e.g., if the authentication server rejects the message, then the service provider's server that invoked the authentication server's API may receive the error as a return of the method invocation (e.g., as shown in FIG. 5 illustrating an Opaque Object communication path).

Figures 10, 11:
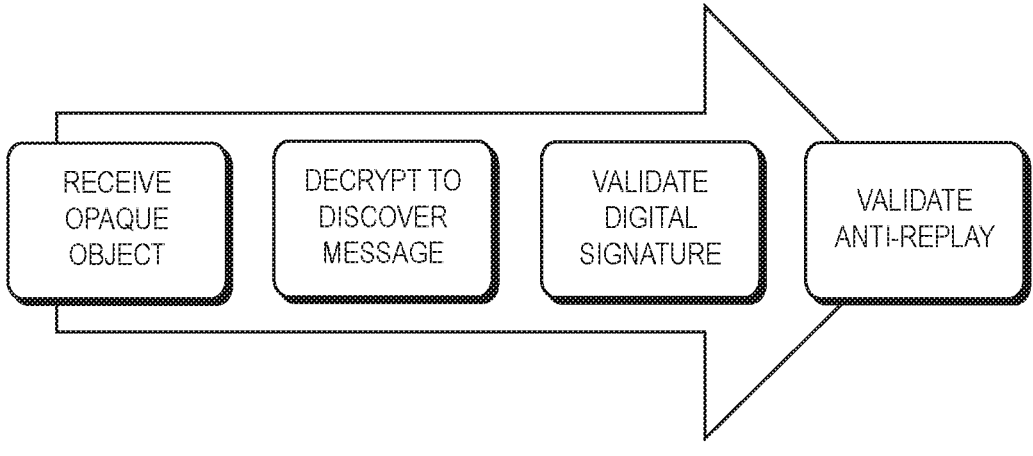
FIG. 10 illustrates receiver validation of a secured object according to some embodiments.
FIG. 11 depicts three logical components of a secured object, according to some embodiments.

In some embodiments, the secured object is a serializable object that protects any information object carrying information to be communicated such as keys, malware lists, application list to be used in detecting whether the device is rooted, location information, etc. The secured object generally relies upon cryptographic controls to ensure that it is an atomic, inseparable object. This means that an adversary typically cannot alter or shuffle the individual components of a secured object. The secured object has three logical components as shown in FIG. 11.

Protected Information Object: In some embodiments, the Protected information object is an application-specific JSON-formatted unit of information that enjoys cryptographic protection. Examples of information Objects are registration, logs, etc., as discussed below.

Anti-Replay: The Anti-Replay component can protect the secured objects from replay attacks. If an adversary were to play back an old secured object, then the peer would detect the playback attack.

Anti-Tamper: In some embodiments, the Anti-Tamper component protects against an adversary who links malware to the client app installed on a user device, a data-collection module associated therewith, and/or a corresponding security module. The Anti-Tamper unit provides a vehicle for securely providing information to a recipient such as a client app, a service provider's server, an authentication server, etc.

Figures 12, 13:
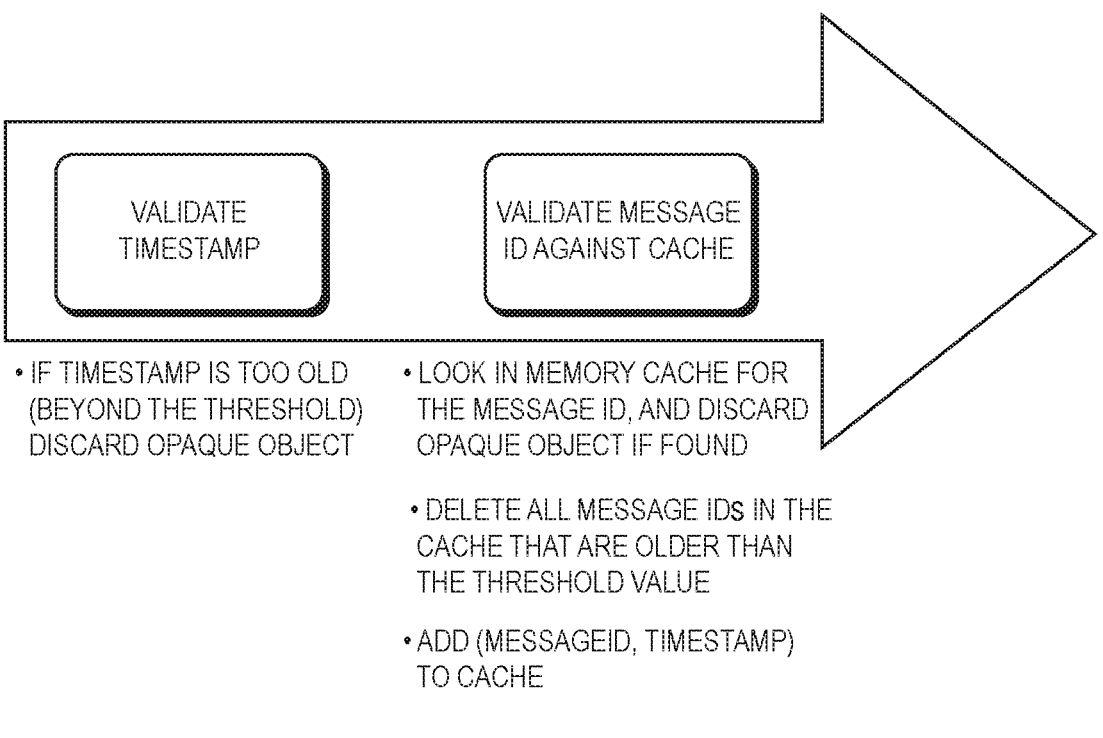
FIG. 12 illustrates anti-replay check according to some embodiments.
FIG. 13 illustrates an example anti-replay detection.

In some embodiments, after performing the first three steps of FIG. 10, the recipient concludes with the anti-replay step illustrated in FIG. 12. The mechanism used to check anti-replay can be similar for both the authentication server and the data-collection module. Each maintains a configurable threshold, e.g., 5 minutes. The description below presents the authentication server's process:

Validate timestamp: Each secured object has a timestamp inserted by the peer (e.g., data-collection module sending a secure object). If the timestamp is older than the threshold subtracted from the current time as observed by the authentication server, then the server discards the secured object. For example, if the current time is 10:00 AM, then the server discards any secured object transmitted before 9:55 AM on the same day.

Validate message id against cache: Each secured object includes a random number used as a message ID. The space of random numbers is large enough (e.g., at least 64 bits) to avoid or at least minimize the possibility of collision. The Authentication Server maintains a cache of ordered pairs of (ObjectID, timestamp) for each peer data-collection module. Upon receipt of an secure object, the Authentication Server first validates that the incoming ObjectID does not appear in the cache for the peer data-collection module. If the ObjectID is in the cache, then the incoming secured object is a replay and the Server discards. Otherwise, the Server accepts the secured object and adds its ObjectID and timestamp to the cache. Finally, the Server discards any records from the cache that are older than the time threshold.

For example, consider the scenario illustrated in FIG. 13. Server 3 receives the secured object on the left of the diagram from data-collection module 1. Server 3 identifies the table for data-collection module 1 and notes three items in the cache. Server 3 compares the ObjectID of the incoming message (42) against the three ObjectIDs in the cache (95, 18, and 77). Since 42 is not in the cache, Server 3 accepts the incoming secured object and inserts (42,10:00) into the cache. Server 3 may subsequently discard (95,9:43) from the cache because it is older than the threshold of 5 minutes.

The anti-replay mechanism assumes that each distributed Authentication Server instance has its own asymmetric key pair. So, Authentication Server1 cannot receive a message intended for Authentication Server2 because Authentication Server1 would not have the requisite decryption key. This assumption protects against an attack where an adversary records an secured object transmitted and processed by one Authentication server, but then plays back the secured object to a second Authentication server. One need not assume that the distributed Authentication servers share state because they may potentially reside in different data centers.

Format of a Secure Object

In some embodiments, the expression of the secured object is in JSON. The secured object has three parts.
encryptedBody: This field contains the encryption of a body of a message. All characters are UTF-8, in some embodiments. The body of a message is also referred to as the information object.
header: Anti-replay and other cryptographic information used to protect a message (hashed message authentication code)
integrity: Digital signature or HMAC used to ensure message authenticity An example format is as shown in FIG. 14A where "data" is a BASE64 encoding of a JSON structure as shown in 14B.

AntiReplay

The purpose of antiReplay is to protect against replay attacks. The first level protection is the "time". Upon receipt, the recipient rejects any "time" value in the future. Additionally, the recipient rejects any time value beyond a threshold in the past. For example, suppose the threshold is 20 minutes. The recipient rejects any message with a "time" value more than 20 minutes in the past. The line threshold can be a few seconds, minutes, hours, or days.

The "time" value protects against gross replay attacks, but does not protect against recent replay attacks. The recipient caches all the message IDs received during the period up to the last threshold. The recipient generally ensures that it never accepts the same messageID twice. In some embodiments, the messageID is a BASE64-encoded value that includes a version number, a period, and a 64-bit value. As long as the time threshold for anti-replay is reasonable, the recipient should only need to hold a handful of session IDs. So, a space of $2^{64}$ session IDs is well-beyond sufficient. However, in some embodiments, we limit the space to 64-bits, because the message digest in the signature is 256 bits. If the message ID were longer, then an adversary would have an opportunity to force hash collisions by manipulating the random-appearing 64-bit value until it produced a desired message digest. By limiting to just 64-bits, the probability of a hash collision is approximately 10-39 for a 256-bit message digest. In other words, the adversary does not have enough space in the message ID to force a hash collision. For messages sent from the data-collection module to the server, the version number is always 0 in some embodiments. In some embodiments, the message digest algorithm is SHA-512 producing a 512 bit message digest; and the random or pseudo randomly generated value has 256 bits.

In some embodiments, the recipient only accepts secured objects with the latest version number. Once the recipient receives a secured object with a version number of i, the recipient may never again accept an secured object with a message ID of i−1 or below. The message-id history is a list of zero or more of the most recently received message IDs. The number of IDs on the list is an implementation detail determined by the sender. Typically, when the server is the sender and the data-collection module is a recipient, then the server sends an empty list. When the data-collection module is the sender and the server is the recipient, then the sender places a few of the latest message-ids on the list.

Crypto

In general, Crypto contains one or more of the following items:

The anti-tamper-md is a message digest used for the purpose of providing tamper protection. When the server validates the message digest, the server ensures that some aspects of the client or application have not been tampered. In addition the anti-tamper-md covers any value returned by the security module for tamper protection. In other words, anti-tamper-md=md(software|SSEvalue). A purpose of the anti-tamper-md is to protect against bot attacks. Suppose, for example, a bot were to link with the data-collection module. In this case, the bot would benefit from authentication security as opposed to being prohibited. The anti-tamper-md combats this scenario by providing the fingerprint of the parent application. A fingerprint can be a message digest (e.g., a SHA-256 message digest) computed over the application. The authentication server expects a software fingerprint for one or more of the client app, the data-collection module, and the security module. Should any of these software modules be modified or replaced without authorization, the fingerprint would change. The authentication server, upon noticing a different message digest than that expected, can determine that the sender software is not genuine.

The anti-tamper-mode specifies what information is covered under the anti-tamper-md. One option is to perform the message digest not only on the data-collection module, but additionally the invoking client application. Upon receipt, the server validates against expectations. The purpose of the anti-tamper-md is to protect against bot attacks. Suppose, for example, a bot were to link with the data-collection module. In this case, the bot would benefit from security provided by some embodiments as opposed to being prohibited. The anti-tamper-md combats this scenario by computing and sending the fingerprint of the parent application. In some embodiments, the anti-tamper-mode has the value "0", then the recipient should ignore anti-tamper-md.

Asym provides the asymmetric algorithm used for encryption.

Sym provides the symmetric algorithm used for encryption

Encode is the encoding scheme, e.g., BASE64 used to encode raw bits peerEncPubKey is the list of public keys that each encrypt the symmetric key signingPubKeyFingerprint is the message digest of the public key used by the data-collection module to sign the secured object wrappedSymEnckey is the list of symmetric keys each wrapped in a public key. The number of wrappedSymEnckeys is equal to the number of peerEncPubKeys wrappedSymIntegKey: When not using a digital signature in order to optimize performance use the SymIntegKey. The algorithm is an HMAC. This value should be set to "0" when using signatures, in some embodiments.

IV is the initialization vector used for symmetric encryption of the body

Body-md is the message digest of the body before it is encrypted.

Analysis of Secured Object

Figures 15, 16A:
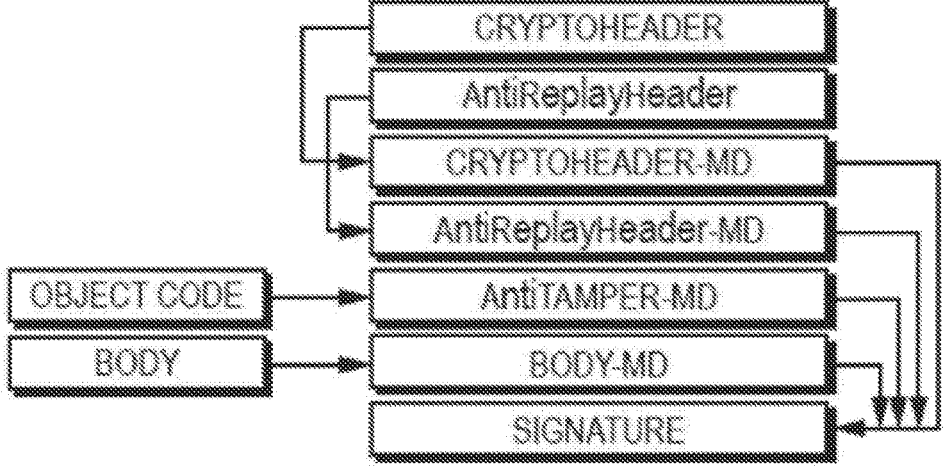
FIG. 15 illustrates a secured object digital signature, according to some embodiments.
FIG. 16A shows an example of an information object format.

Secured Object Integrity: FIG. 15 illustrates a diagram of the secured object digital signature. As illustrated in the diagram, if any aspect of the secured object were changed by an unauthorized party, then the digital signature would not validate. As a result, all headers and bodies enjoy integrity protection provided that the adversary does not discover the value of the private key.

In addition, the secured object includes the message digest of the banking application coupled with the data-collection module. The digital signature ensures that no man-in-application or man-in-middle can change the message digest in transmission. So, when the server receives the antiTamper-md, the server may check to ensure that the data-collection module linked to a correctly authorized application.

Secured Object Replay Protection: The recipient receives an secured object in exactly one of the following three conditions:

The timestamp of the secured object is not in the future from the perspective of the recipient AND the timestamp has not expired.

The timestamp has expired

The timestamp is in the future

Since a timestamp is a distinct point, it must reside within exactly one of the three conditions. However, the server rejects any incoming message unless the timestamp satisfies the first condition. Within this condition, the server uses its message ID cache to protect against replay.

Cryptographic Performance Optimization

When a user opens a client app on a mobile device, the application initializes the data-collection module. On the first message that the data-collection module sends to the server, no facility for cryptographic optimization generally exists. However, on all subsequent messages, the data-collection module may optionally elect to optimize performance by eliminating asymmetric cryptographic operations. Since symmetric cryptography operates quickly, and asymmetric cryptography is typically relatively slow, the performance optimization may be substantial.

In some embodiments, in order to optimize performance, the data-collection module caches the cryptoheader of the first message in memory. The data-collection module reuses the cryptoheader on all subsequent messages in the session thereby avoiding re-wrapping the session key. The data-collection module may use the wrappedintegritykey in order to ensure the integrity of subsequent messages. Since the integrity key was signed in the first message, the protocol can protect against an attacker who attempts to use his or her own integrity key.

The cryptographic performance optimization has a security tradeoff. By caching keys, the data-collection module may be more vulnerable to attack because multiple messages are encrypted with the same key. Furthermore, by reusing symmetric keys the cryptographic assurance may not be quite as high as using a unique symmetric key on every message.

Information Object

The information object contains the information required to drive the various authentication semantics. Each information object has a type-header which describes its purpose. The remainder of the information object contains information specific to its type.

Information Object Format: The format of an information object according to some embodiments is shown in FIG. 16A with examples of "appObj" in FIGS. 16B, 16C, and 16D. The information object format can be an array of one or more "appObj".

Information Object Process

Figure 17:
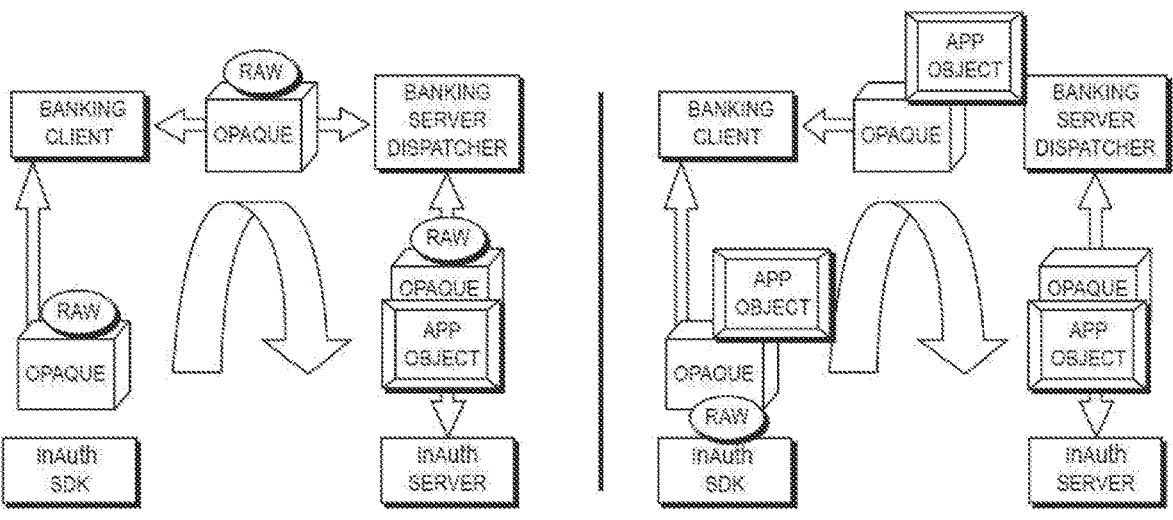
FIG. 17 illustrate different modes of transmission of information between a data-collection module and a server, with one or more untrusted intermediaries, according to some embodiments.

Two options exist for communicating an information object as illustrated in FIG. 17 below. The diagrams illustrate a transmission that originates in the data-collection module and terminates at the authorization server, with the service provider's client and/or server/dispatcher as untrusted intermediaries. Both diagrams illustrate secured objects that communicate from the data-collection module to the server.

The two diagram differ, however; at the point in which they format the information object. In the diagram on the left, the data-collection module populates the secured object with raw data such as an unmodified log file. Upon reception, the Server unpacks the secured object, and then parses the raw data to form the information object. In the diagram on the right, the data-collection module first parses the raw data to form an information object, and then the data-collection module inserts the information object into the secured object.

Regardless of the chosen option, the result is generally the same: the authentication server receives an information object. The architectural choice is left to a software system developer. The advantage of the approach on the left is that it offloads processing cycles onto the users' devices. The advantage of the approach on the right is that it allows for simpler application code to be installed onto the device thereby facilitating debugging and updates.

Install:

In some embodiments, when a user first installs a client app, the app invokes the install service. The install service creates a non-volatile file using the cryptographic protection mechanisms called appid. The install service creates a 256-bit number and inserts this number into this file. The purpose of the appID is to ensure separation when multiple protected client applications reside on the same device. This can avoid the possibility of one application attacking another by confusing keys. In some embodiments, the master keys are generated by referencing an appID corresponding to a client app, and other information collected from the user device. In this way, each client application operating on a single user device can have different master keys.

In some embodiments, when a user runs the client app invoke the data-collection module's init service immediately. The init service polls the authentication server to determine if any new configuration files (e.g., malware and root signature files) exist and have not yet been installed. The init service can install the configuration files prior to exchange of information for user authentication.

Root Detection:

In some embodiments, root detection exports an API that has no input parameters. As an output parameter, the root detection API produces an secured object that contains an information object of the rootResult type. The root detection service first searches the device for indication of root access:

1. In some embodiments, the data-collection module, includes software that implements isRootAvailable( ) and isRootAccessGiven( ). These routines can be effective is identifying evidence of root access.
2. Search for root or superuser-like applications and see if they are currently running.
3. Find root hiders and see if they are running.
4. Find root related applications (apps installed only with rooted phones) and see if they are running
5. check if ro.secure flag was changed
6. find root if related directories are created This search produces a Boolean result coupled with a description. The service may generate an information object having a type "rootResult" populated with the result and findings from the search. Next, the root detection service may pass the rootResult to the data-collection module, which can generate a corresponding secured object for transmission of the root results to the authentication server.

Malware Detection:

In some embodiments, malware detection exports an API that has no input parameters. As an output parameter, the malware detection API produces a secured object that contains an information object of the malwareResult type. The malware detection service first looks into the local sandbox of the application to find a malware signature file. If the malware signature file does not exist or has expired, then the malware detection returns an error. The malware detection service is not responsible for obtaining the malware signature file in some embodiments. After obtaining the malware signature file, the malware detection uses the services of the security module to check tamper by validating the digital signature of the malware signature file. This check protects against man-in-application attacks that corrupt files in the application's sandbox.

Parse the malware and then search the device to determine if any application installed and/or running on the device has a message digest that equals a value in the malware signature file. This search may produce a Boolean result coupled with a description. This result can be included as an information object of type malware result, which may then be included in a secured object, and transmitted to an authentication server.

Location Detection

Location Services Implemented in the Data-Collection Module: The data-collection module may collect one or more of the following types of location-related information to send to the server.

Cell tower: Query the device for the physically closest cell phone towers, and upload to the server.

WIFI: Identify the SSID and MAC address using the same functions as required to obtain cell phone data.

DNS: Obtain a GIF image that has no display. Query the DNS for the domain name, where the DNS resolves to the ISP. The ISP then resolves to the domain server, thereby providing the location of the ISP's DNS.

GPS: Query the GPS coordinates.

Location Services implemented in the Authentication Server: In some embodiments, the authentication server may implement the following logics:

Cell tower: Upon receipt of the cell tower data from the device, lookup in a database. The database cross references between cell tower names and geographical locations. The server resolves against this database to provide the location.

Wifi: The server's WIFI solution is the same as the cell tower. When possible, use a service with both cell tower and wifi information.

Debugger/Emulator

The presence of a debugger and/or an emulator on a client device may suggest that the client app, the data-collection module, and/or the security module is compromised or tampered with. In some embodiments, the data-collection module can detect if a debugger and/or an emulator is attached to a client app, the data-collection module, and/or the security module. If the presence of a debugger and/or an emulator is detected, that information may be sent via a secured object to an authentication server.

Certificate Pinning

The purpose of the certificate pinning service is to detect an intermediate proxy which may interrupt, modify, or view confidential information. In some embodiments, the Certificate Pinning service can be redundant because the secured object already addresses the security requirements as discussed above. However, the Certificate Pinning service may be useful to the client app itself because the client app may rely upon mechanisms other than secured objects, such as HTTPS for protecting its communication. For example, if an online banking service were to pass bank account numbers, credit card numbers, or passwords over the Internet, then the banking service would need an assurance that the HTTPS connection is secure.

In some embodiments, the certificate pinning service operates over the trusted path offered by a secured object. The certificate pinning service exports an API that has no input parameter. If invoked, the certificate pinning service creates a secured object, and populates the secured object with an information object of the certificate type. The Certificate Pinning service has the choice of either populating the information object with the entire certificate, or the message digest of the certificate. The certificate pinning service returns the secured object that contains the information object as an output parameter.

The certificate pinning service looks into the SSL connection object in Android or IOS to find the certificate of the current SSL or TLS session. Then, the certificate pinning service writes this certificate or message digest into the information object.

Registration

Registration exports an API that accepts a filename as a parameter. The filename has the name of a data key in the sandbox. As an output parameter, the registration API produces a secured object that contains an information object which includes the data key. The registration service first looks in the application's sandbox to see if files exist representing the private key. If the file does not exist, then the registration service forms a new asymmetric key pair and populates the files. Next, the registration service collects the Permanent ID (PID) of the device by invoking the permanent id service.

The registration service uses the services exported by the security module to create encrypted and signed files in the application's sandbox holding the private key and clientID (ID of a client app or a server). The registration service builds an information object by populating the respective fields. Lastly the registration service builds and sends a secure object that includes the information object, that includes the new public key and the corresponding permanent device ID. The status value can be "new" indicating a registration of a new device, a device for which the application was uninstalled and then re-installed, or a device which has been wiped or reset.

Re-Registration

Re-registration accepts a filename, fname, as an input parameter, where the filename represents the data key which holds the asymmetric key pair for the device. This process can use the data-collection module's delete( ) method to destroy evidence of a previous registration by deleting any old files with the same name.

The data-collection module can then create a new asymmetric key pair, and store it in the sandbox of the client app using the security module, as described above. The data-collection module may build an information object including the re-registration information (e.g., including the newly generated key pair). Using the information object, the data-collection module can build and transmit a secured object to an authentication server.

Un-Registration

A reset or un register operation deletes the files in the client's sandbox representing a private key. The data-collection module then builds an information object of type unregister, builds a corresponding secured object, and sends that object to an authentication server. The data-collection module may follow a similar process as the re-registration service to clean up non-volatile files holding old keys.

Version

Version exports an API that has no input or output parameters. As an output parameter, version produces an secured object that contains an array of version numbers of IA Files, e.g., malware signature file, root signature file, and log configuration file. Each version number additionally includes the file's name (type).

Permanent ID

The service creates the Permanent ID (PID) of the device.

ANDROID: On the ANDROID operating system, the components of the PID are: MEID (mobile equipment identifier) and other values extracted from the device. The server processes the Android_ID separately from the other components because the Android_ID does not survive data wipes. However, the server uses the Android_ID as a redundant check. If the server detects that the Android_ID changed when the other components remained unchanged, then the server executes its exception processing algorithms.

The service creates the following JSON object:

```
{
  {"pid":
    {"meid":"0980980",
    },
  },
}
```

Next, the service uses the canonicalize( ) method to convert into a serializable string (see HLD). Next, the service creates the message digest over the canonicalized method to form the pid. The service returns this pid as the result.

IOS: The service implements the IOS's pid method similarly to the Android method, by creating a JSON object of the components, canonicalizing, and then returning the message digest.

MessageID Maintenance

The MessageID maintenance service helps protect against playback attacks for messages sent from the server-to-data-collection module. As described above, the recipient may discard secured objects that are older than the threshold or secured objects that have a future timestamp. Within the span of the threshold, the recipient may check that it receives no particular messageID twice. Additionally, the recipient can check that no secured object contains a messageid with a version number less than the highest version number so far received.—

When the recipient is the server, the solution is relatively straight-forward. The recipient maintains a list of message-IDs received from each data-collection module in a secure database; and the server validates each incoming messageID upon receipt. However, when the recipient is the data-collection module, no easily-secured database exists to manage the history of received messageIDs. Instead, the data-collection module manages the history in a file (called msgid.txt in some embodiments) in the application sandbox; and protects the file using the non-volatile cryptographic mechanisms described in above. Whenever the data-collection module receives an secured object from the server, the data-collection module checks the timestamp against the threshold, and then checks the messageID of the secured object against the list stored in msgid.txt. Additionally, the data-collection module checks to ensure that it has no messageID with a later version number than the incoming secured object.

An attacker probably lacks the ability to break through the file's cryptographic protections. So, msgid.txt forgery is not highly probable. However, the adversary may attempt some simpler attacks:

Delete the msgid.txt file

Overwrite the msgid.txt file with an older version

These attacks require no cryptography, but both can defeat the anti-playback protection as illustrated in below. The attack illustrates a two legitimate messages transmitted from the server to the data-collection module labeled 1 and 2 respectively. However, the adversary restores the historical msgid.txt which existed after receipt of the first secured object but prior to the receipt of the second secured object. At this point, the adversary can replay the second secured object thereby defeating the anti-replay mechanism.

The data-collection module combats against this attack using the messageid-history which contains the historical list of messageIDs received by the data-collection module. Upon receipt, the server validates the history of histories to ensure that that the history grows for each data-collection module. The server permits the data-collection module to discard a messageid from the historical list in the secured object if the messageid were to have preceded the threshold; however, the history list must contain all messageids that are still within the current threshold period. If the server observes missing messageids, then the server raises an exception.

In some embodiments, once decrypted, the format of the msgid.txt file is a two column list. The first column has messageIDs, and the second column has the date-timestamp of the messageID. The messageID maintenance service ensures that the msgid.txt file is always sorted with the most recent messageid first. Whenever the data-collection module returns a secured object, the data-collection module reads the msgid.txt file to find all the messageIDs since the last timestamp, and inserts the messageIDs into the messageid-history of the secured object.

As such, the authentication server can verify that the last message ID(s) it sent to a data-collection module are returned in a subsequent message. If those message ID(s) are not returned, the authentication server may conclude that an attacker deleted the message ID history on the user device sandbox and/or replaced the message ID history with an older version. Upon this detection, the server can detect the possibility of a replay attack and/or tampering, and may take appropriate action.

Trust Model

Figure 18:
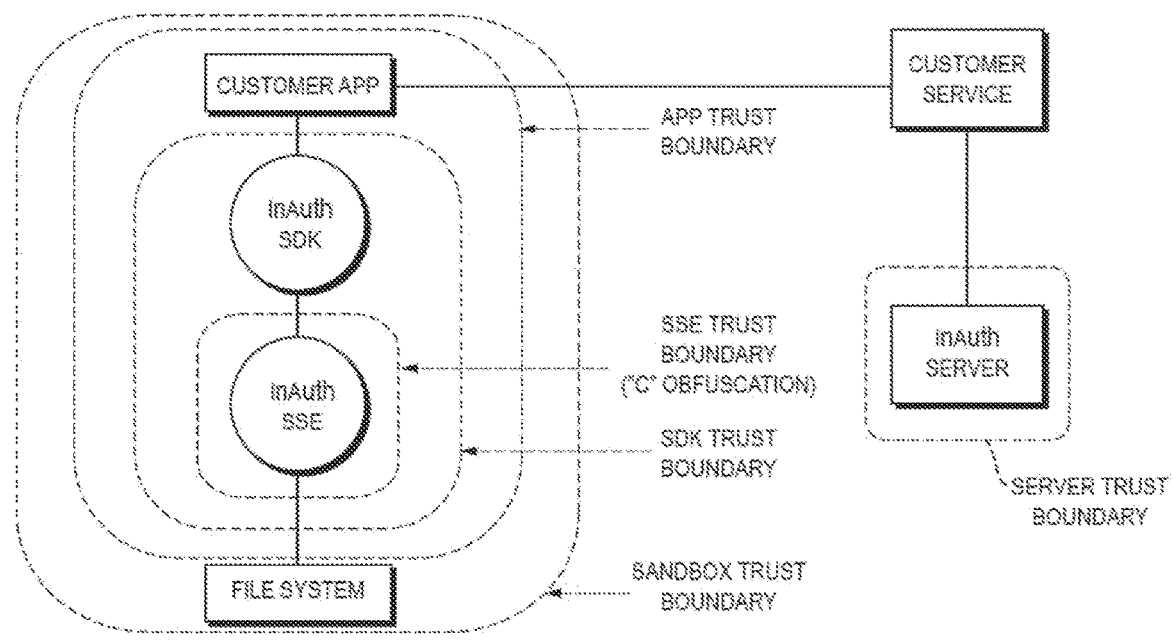
FIG. 18 illustrates a trust model providing a different method of protection at each trust boundary, according to some embodiments.

FIG. 18 illustrates a trust model according to some embodiments. The environment provides a different method of protection at each trust boundary, as described below.

Security module trust boundary: In some embodiments, the security module may be implemented in "C" because the "C" language offers many opportunities for obfuscation and anti-tamper, and cannot be reverse engineered easily. The security module may be implemented, however, using other high level languages such as Objective-C, JAVA, etc. An adversary may encounter extreme difficulty in viewing confidential information such as cryptographic keys in memory or modifying the execution of the security module when that module is obfuscated.

The security module can cryptographically protects information from unauthorized disclosure or modification before writing to the local non-volatile sandbox file system. In some embodiments, each file has a unique per-file key. No two devices and/or no two client apps installed on a single device may share the same non-volatile storage key. Each non-volatile storage key itself may be encrypted one or more times to form a key hierarchy. Each level of the key hierarchy can use a different method of protection thereby forcing a potential adversary to execute many attacks simultaneously, while requiring different attack methods at each level of the encryption hierarchy, making unauthorized access to a key extremely difficult if not impossible.

Data-collection module trust boundary: In some embodiments, the data-collection module does not permit access to any cryptographic keys outside the boundary of the data-collection module or the boundary of the security module. Implementation of the data-collection module may also be provided with obfuscation protection.

Client app trust boundary: A service provide may link its client application to the data-collection module.

Sandbox trust boundary: In some embodiments, the data-collection module implements root and malware detection. If malware attempts to jump the sandbox boundary and access the client application's protected sandbox, a detective control implemented in the data-collection module and/or the security module may raise a flag. The data-collection module may upload the flag through a trusted path to a server in order to ensure that the server obtains correct and timely information. The integrity-protection mechanism offered through the secured object's signature can protect against unauthorized modification of this flag. The secured object's anti-replay mechanism can protect against a replay of an old message that was generated presumably prior to the detected infection.

Server trust boundary: The authentication (also called authorization) server typically resides in the application's data center, and is protected using sophisticated security systems.

In some embodiments, one or more of the operations that may be performed by a data-collection module may instead or in addition to the data-collection module be performed by the security module. Examples of such operations include generation/encryption/decryption of a secured object, generation/encryption/decryption of an information object, generation/encryption/decryption of one or more headers of the secured object, performing anti-replay and/or anti-tamper checks, etc. The information object may include a permanent ID of a user device, location data, results of malware check, root check, etc. If the security module generates an information object and/or a secured object, the information contained therein need not leave the boundary of the security module.

Server-to-Data-Collection Module Communication Model

Once the server creates a config file, the server packs the config file into an secured object, and then posts the secured object on the web server. Whenever an application starts up, the application can obtain all of the posted secured objects, that include the config file(s). A config file may include information such as message ID, version number, whitelist for logging service, blacklist of apps that should not be present on a user device, a list of apps to scan to detect a rooted device, and/or a list of malware.

In some embodiments, the data-collection module looks into its message ID file to see which secured objects were already installed. For these repeats, the data-collection module simply discards. Otherwise, the data-collection module accepts the posted secured object, updates msgid.txt, and places the configuration file into the sandbox using the non-volatile cryptographic protections as described above.

If the server receives a secured object with an outdated messageid-history, then the server blocks further processing and returns an error. The client app may shut down and restart. Upon restart, the client app may install the latest secured objects into the data-collection module. In some embodiments, the format of each configuration file is a SAML assertion, as described below:

a ID: The ID is messageid of the secured object that holds the configuration file. Upon receipt, the data-collection module verifies to ensure that the ID and the messageID match. Otherwise, the data-collection module discards the secured object. If the validations succeed, then the data-collection module stores the entire configuration file (including its SAML header) in the sandbox using the cryptographic protections. The file-name is the ID. The data-collection module does not delete any configuration files until the next time that the server increases its version number of the messageid in the secured object.

IssueInstant: The IssueInstant field defines a time and date stamp which marks when the server first publishes the configuration file version. When the application start up, the application reads and decrypts the configuration files in the sandbox. Whenever two configuration files each contain the same type of information, the data-collection module selects the configuration file with the latest IssueStatement. The data-collection module may delete the old configuration file from its sandbox.

Version: The version field is reserved by SAML. Some embodiments use the value "2.0".

Issuer: The issuer is the name of the party who issued the configuration file, such as the authentication or service provider's server.

Subject: The purpose of the subject field is to provide different configuration files to each end-user. When not used, the subject field has a transient identifier which can change on every new version of a configuration file.

Conditions: The conditions field marks a NotBefore and NotAfter time and date stamp. These fields allow the data-collection module to immediately identify an error if the data collection module were to use a configuration file that does not satisfy its conditions.

AttributeStatement: The AttributeStatement contains the configuration file. Each configuration file resides within its own attribute. The server may submit multiple attributes in the same SAML token, or split into separate SAML tokens. Each secured object may not hold more than one SAML token.

The types of configuration files are described below:

White List: The example in FIG. 19 depicts a White List that covers the accelerometer and location logs. The data-collection module may collect only these logs related to accelerometer and location, and submit to the server. The data-collection module may not collect no other logs.

Malware Signature List: The example in FIG. 20 depicts a Malware Signature List. The data-collection module may search for the specified malware.

Root Signature List: The root attribute of the root signature list defines the name of a particular installation for which the data-collection module may search. The weight depicts the relative importance. Higher weight values represent greater importance, in some embodiments. Roottest is a special attribute which defines a specific test. FIG. 21 shows an example of a Root Signature List.

Blacklist: The system identifies three types of blacklists:

Phish: list of banned e-mail addresses. Scan for communication with these addresses.

Smish: list of banned phone numbers. Scan for SMS text messages with these numbers.

Device: List of banned devices. For each device, identify the pid, provenance, surety, and reason for banning.

An example Blacklist is shown in FIG. 22.

As described herein, using secured objects for communication in either or both directions, a trusted path can be established between a client and a server. In various embodiments, a trusted path can offer end-to-end security, and solutions to pitfalls that may befall other techniques. In comparison, HTTPS has multiple deficiencies such as:

HTTPS generally does not offer message-oriented replay protection. For example, an adversary may potentially replay an old root or malware detection result through an existing HTTPS channel.

HTTPS normally authenticates only a single side of the communication channel.

Numerous HTTPS vulnerabilities were uncovered in recent years.

Encryption gaps in a datacenter's DMZ (also called perimeter) or internal networks may render cryptographic gaps when using HTTPS.

HTTPS generally does not offer non-repudiation

In various embodiments, the trusted path architecture can protect against many different attack classes:

Protection against key discovery: In some embodiments, asymmetric private keys never export out of the security module and/or the data-collection module implemented in an obfuscated manner; each private key may have multiple layers of key wrapping/encryption.

Protection against key modification: In some embodiments, each key has its own key wrapping/encryption hierarchy.

Protection against signing with a compromised key: In some embodiments, the security module can self-validate its own integrity and/or whether a data-collection module and/or a client app (and even a server) was tampered with. As such, an adversary cannot masquerade as a data-collection module and/or a client app without breaking the integrity control.

Setup or provision adversary's key: In some embodiments, the messaging solution offers opportunities to orchestrate an onboarding flow that leverages authentication via a trusted path. For example, the service provider may authenticate a password before onboarding a user device such as a smart phone, a tablet computer, a laptop, a desktop, etc.

Protection against a replay attack: In some embodiments, the security module can validate communicated secured objects and/or encrypted files in the sandbox to protect against unauthorized replay.

The various embodiments and features described herein may be used in any combination, as the combination of these embodiments and features are well within the scope of the invention. While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the claims presented below and their legal equivalents.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for secure exchange of information on a network between a client device and a server on a network, the method comprising:

encrypting, by a data-collection application or a security application associated with the data-collection application on the client device, a data element using a server public key to generate on the client device a secured object, receiving, by the server, the secured object, wherein the secured object comprises an encrypted message used by the server to authenticate the client device, wherein the encrypted message comprises within the encrypted information at least a timestamp of the time the secured object was composed, a message identifier, a digital signature of the secured object signed by a private key on the client device, and a message digest comprising at least one or more of an anti-replay header and an anti-tamper header;

decrypting, by the server, the encrypted message;

validating, by the server, the digital signature of the decrypted message using a public key associated with the client device;

determining, by the server and the timestamp of the secured object, that the secured object was previously received more than a set threshold period of time before the time of receipt, or when an identifier cache at the server already contains the identifier or contents of the anti-replay header of that secured object;

determining, by the server, that one or more applications on the client device were altered when a message digest at the server does not match the message digest of the secured object as is expected to be produced by untampered versions of those applications on the client device;

discarding the secured object when the digital signature of the secured object cannot be verified, or when the secured object is determined to have been received prior to the set threshold period, or when the message is determined to have been replayed, or when the one or more applications on the client device were determined to be altered, and if the object is not discarded, then, preparing, by the server, a download in reply to a validated secured object from the client device;

digitally signing, by the server's private key, the download to the client device;

encrypting the download, by the server, using the public key associated with the client device; and receiving, by the client device, the signed and encrypted download.

2. The method of claim 1, further comprising: determining that the timestamp of the secured object corresponds to a time that is later than the current time.

3. The method of claim 1, further comprising: clearing, by the server, the identifier cache after a specified time period has passed.

4. The method of claim 1 wherein the encrypted message further comprises an encrypted message history, the message history comprising a list of previously sent message identifiers and timestamps, wherein each timestamp corresponds to each of the previously sent message identifiers.

5. The method of claim 4, wherein determining that the secured object was previously received further comprises: comparing, by the server, the message history of the encrypted message to an expected message history at the server or client device based upon previously received messages;

determining, by the server, that the secured object was previously received when the expected message history does not match the message history of the encrypted message.

6. The method of claim 5, further comprising:

removing, by the server, a previously received message identifier and a corresponding timestamp from the expected message history when a difference between the corresponding timestamp and the current time exceeds a specified removal threshold.

7. The method of claim 1, further comprising:

sending, when the secured object was determined to be previously received or when the one or more applications on the client device were determined to be altered, a message to the client device that the secured object was discarded.

8. A system, comprising:

a memory; and at least one processor coupled to the memory and configured to:

encrypt, by a data-collection application or a security application associated with the data-collection application on the client device, a data element using a first level storage key to generate a secured object, wherein the first level storage key comprises at least one of:

(i) a public key of the server, the public key for encrypting information to be received by the data-collection application in a transmission from the server;

(ii) a private key of the data-collection application, the private key of the data-collection application for generating a signature for the information to be transmitted to the server from the client device;

(iii) a public key of the data-collection application, the public key of the data-collection application for encrypting information to be transmitted from the client device to the server; and (iv) a private key of the server, the private key of the server generating a signature for information to be transmitted to the client device from the server;

receive on the server the secured object, wherein the secured object comprises an encrypted message used by the server to authenticate the client device, wherein the encrypted message comprises within the encrypted information at least a timestamp of the time the secured object was composed, a message identifier, a digital signature of the secured object signed by a private key of the client device, and a message digest comprising at least one or more of an anti-replay header and an anti-tamper header;

decrypt, by the server, the encrypted message;

validate the digital signature of the decrypted message using a public key associated with the client device;

determine, by the server and the timestamp of the secured object, that the secured object was previously received more than a set threshold period of time before the time of receipt or when an identifier cache at the server already contains the identifier or contents of the anti-replay header of the secured object; determine, by the server, that one or more applications on the client device were altered when a message digest at the server does not match the message digest of the secured object as is expected to be produced by untampered versions of those applications on the client device; and discard the secured object when the digital signature of the secured object cannot be verified or when the secured object is determined to have been received prior to the set threshold period, or when the message is determined to have been replayed or when the one or more applications on the client device were determined to be altered and if the object is not discarded, then preparing by the server, a download in reply to a validated secured object from the client device;

digitally signing, by the server private key, the download to the client device;

encrypting the download, by the server, using the public key associated with the client device; and receiving, by the client device, the signed and encrypted download.

9. The system of claim 8, wherein the at least one process is further configured to: determine that the timestamp of the secured object corresponds to a time that is later than the current time.

10. The system of claim 8, wherein the at least one process is further configured to: clear the identifier cache after a specified time period has passed.

11. The system of claim 8, wherein the encrypted message further comprises an encrypted message history, the message history comprising a list of previously sent message identifiers and timestamps, wherein each timestamp corresponds to each of the previously sent message identifiers.

12. The system of claim 11, wherein to determine that the secured object was previously received, the at least one processor is further configured to:

compare the message history of the encrypted message to an expected message history based upon previously received messages at the server or client device;

determine that the secured object was previously received when the expected message history does not match the message history of the encrypted message.

13. The system of claim 12, wherein the at least one process is further configured to:

remove a previously received message identifier and a corresponding timestamp from the expected message history when a difference between the corresponding timestamp and the current time exceeds a specified removal threshold.

14. A non-transitory computer-readable device having instructions stored thereon that, when executed by at least one computing device, causes the at least one computing device to perform operations comprising:

encrypting, by a data-collection application or a security application associated with the data-collection application on the client device, a data element using a server public key to generate on the client device a secure secured object, to the client device from the server:

receiving, by a server, the secured object, wherein the secured object comprises an encrypted message used by the server to authenticate a client device, wherein the encrypted message comprises within the encrypted information at least a timestamp of the time the secured object was composed, a message identifier, a digital signature of the secured object signed by a private key on the client device, and a message digest comprising at least one of an anti-replay header and an anti-tamper header;

decrypting, by the server, the encrypted message;

validating, by the server, the digital signature of the decrypted message using a public key associated with the client device;

determining, by the server and the timestamp of the secured object, that the secured object was previously received more than a set threshold period of time before the time of receipt, or when an identifier cache at the server already contains the identifier or contents of the anti-replay header of the secured object of that secured object;

determining, by the server, that one or more applications on the client device were altered when a message digest at the server does not match the message digest of the secured object as is expected to be produced by untampered versions of those applications on the client device;

discarding the secured object when the digital signature of the secured object cannot be verified or when the secured object is determined to previously have been received prior to the set threshold period or when the message is determined to have been replayed or when the one or more applications on the client device were determined to be altered, and if the object is not discarded, then preparing, by the server, a download in reply to a validated secured object from the client device;

digitally signing, by the server private key, the download to the client device;

encrypting the download, by the server, using the public key associated with the client device; and receiving, by the client device, the signed and encrypted download.

15. The non-transitory computer-readable device of claim 14, the operations further comprising:

determining that the timestamp of the secured object corresponds to a time that is later than the current time.

16. The non-transitory computer-readable device of claim 14, the operations further comprising:

clearing, by the server, the identifier cache after a specified time period has passed.

17. The non-transitory computer-readable device of claim 14, wherein the encrypted message further comprises an encrypted message history, the message history comprising a list of previously sent message identifiers and timestamps, wherein each timestamp corresponds to each of the previously sent message identifiers.

18. The non-transitory computer-readable device of claim 17, wherein determining that the secured object was previously received further comprises:

comparing, by the server, the message history of the encrypted message to an expected message history at the server or client device based upon previously received messages;

determining, by the server, that the secured object was previously received when the expected message history does not match the message history of the encrypted message.

19. The non-transitory computer-readable device of claim 18, the operations further comprising:

removing, by the server, a previously received message identifier and a corresponding timestamp from the expected message history when the difference between the corresponding timestamp and the current time exceeds a specified removal threshold.

20. The non-transitory computer-readable device of claim 14, the operations further comprising:

sending, when the secured object was determined to be previously received or when the one or more applications on the client device were determined to be altered, a message to the client device that the secured object was discarded.

\* \* \* \* \*